United States Patent
Kim et al.

(10) Patent No.: US 9,086,729 B2
(45) Date of Patent: Jul. 21, 2015

(54) DISPLAY DEVICE GENERATING TACTILE FEEDBACK AND METHOD OF CONTROLLING THE SAME

(71) Applicant: LG ELECTRONICS INC., Seoul (KR)

(72) Inventors: Jihwan Kim, Seoul (KR); Jongho Kim, Seoul (KR); Sinae Chun, Seoul (KR); Eunhyung Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 25 days.

(21) Appl. No.: 14/150,332

(22) Filed: Jan. 8, 2014

(65) Prior Publication Data
US 2015/0084878 A1 Mar. 26, 2015

(30) Foreign Application Priority Data
Sep. 26, 2013 (KR) .................. 10-2013-0114490

(51) Int. Cl.
  *G06F 3/041* (2006.01)
  *G06F 3/01* (2006.01)
  *G06T 3/60* (2006.01)

(52) U.S. Cl.
  CPC ............ *G06F 3/016* (2013.01); *G06F 3/041* (2013.01); *G06T 3/60* (2013.01)

(58) Field of Classification Search
  USPC ......................... 345/173, 174, 179
  See application file for complete search history.

(56) References Cited

U.S. PATENT DOCUMENTS

| | | | |
|---|---|---|---|
| 8,286,098 B2 | 10/2012 | Ju et al. | |
| 8,400,283 B2 | 3/2013 | Fadell et al. | |
| 2009/0135164 A1* | 5/2009 | Kyung et al. | 345/179 |
| 2009/0322498 A1 | 12/2009 | Yun et al. | |
| 2010/0044121 A1 | 2/2010 | Simon et al. | |
| 2010/0238116 A1 | 9/2010 | Shin | |
| 2011/0025480 A1 | 2/2011 | Hwang et al. | |
| 2011/0264491 A1* | 10/2011 | Birnbaum et al. | 705/14.4 |
| 2013/0113715 A1* | 5/2013 | Grant et al. | 345/173 |
| 2013/0211418 A1* | 8/2013 | Lim et al. | 606/130 |
| 2013/0222275 A1 | 8/2013 | Byrd et al. | |
| 2014/0078102 A1* | 3/2014 | Araki | 345/174 |
| 2014/0218307 A1* | 8/2014 | Goldman-Shenhar et al. | 345/173 |
| 2014/0249927 A1* | 9/2014 | De Angelo | 705/14.64 |

FOREIGN PATENT DOCUMENTS

| | | |
|---|---|---|
| KR | 10-2010-0104975 A | 9/2010 |
| KR | 10-2011-0026686 A | 3/2011 |

* cited by examiner

*Primary Examiner* — Fred Tzeng
(74) *Attorney, Agent, or Firm* — Birch, Stewart, Kolasch & Birch, LLP

(57) ABSTRACT

Disclosed is a method of controlling a display device including displaying a digital image, detecting a first control input to rotate the digital image, generating a first tactile feedback in a first part of a touch region and a second tactile feedback in a second part of the touch region when rotation of the digital image begins, changing at least one of the first and second tactile feedbacks according to a first rate if a rotation angle of the digital image is a first angle, and changing at least one of the first and second tactile feedbacks according to a second rate if the rotation angle of the digital image is a second angle. The first rate and the second rate is a rate of the second tactile feedback in relation to the first tactile feedback, and the second rate is greater than the first rate.

20 Claims, 8 Drawing Sheets

FIG. 3
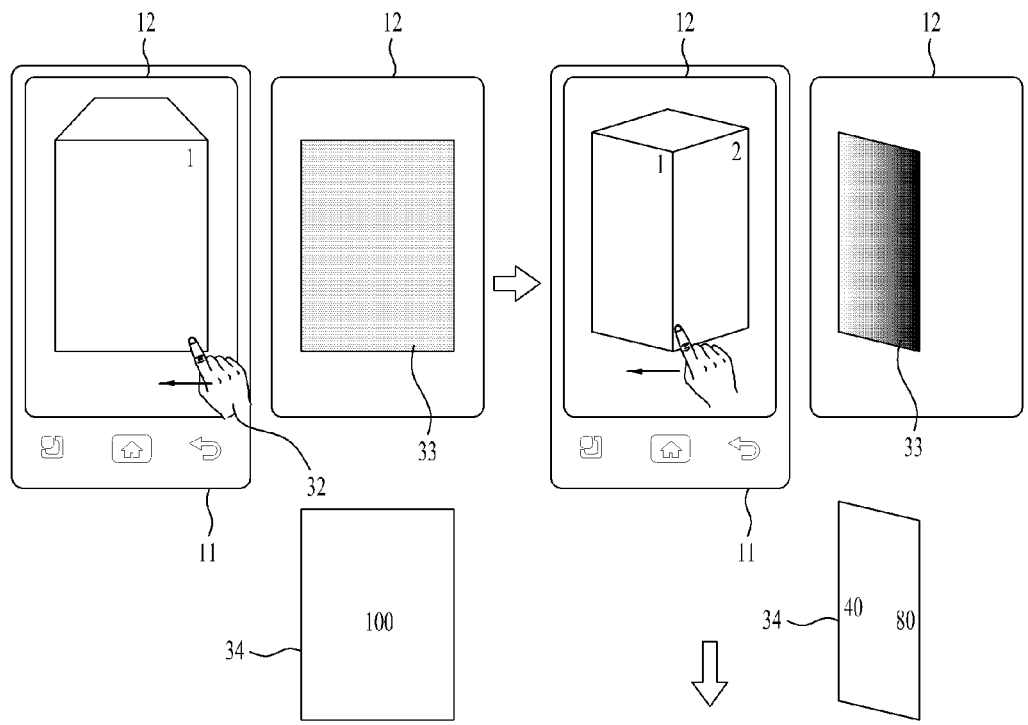
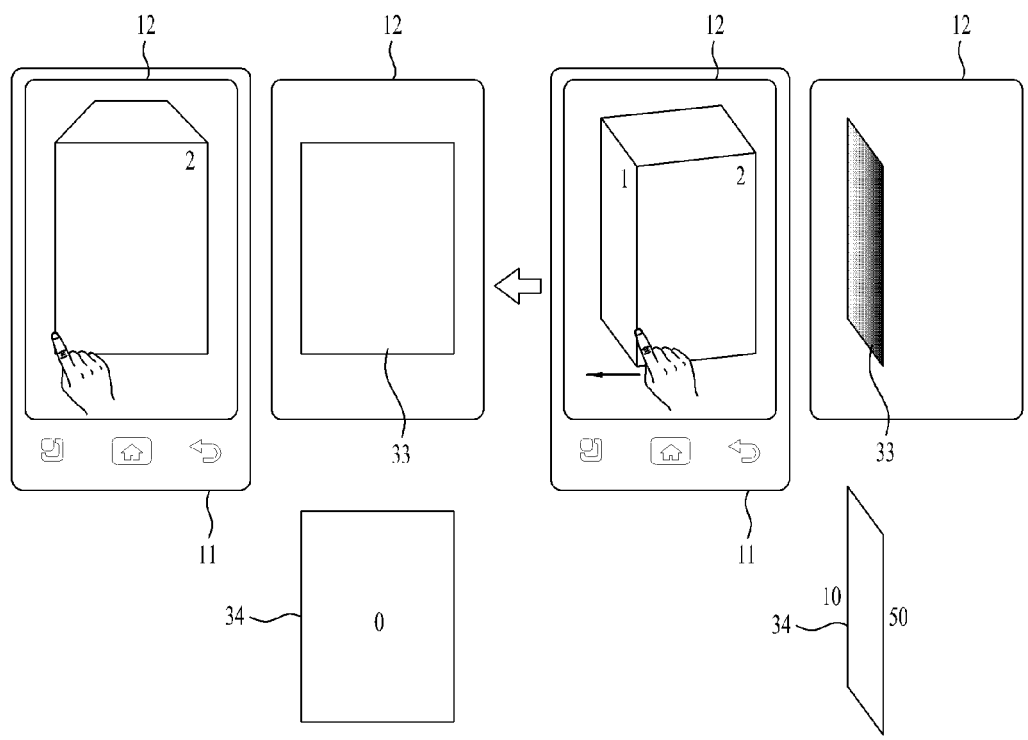

FIG. 4
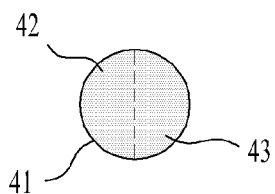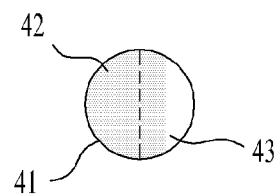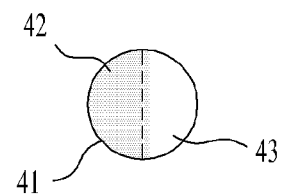
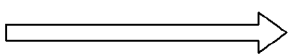
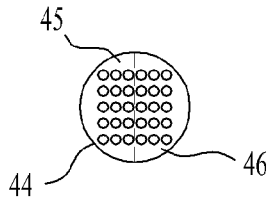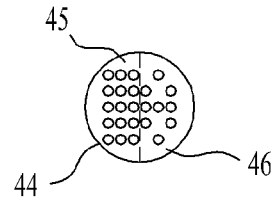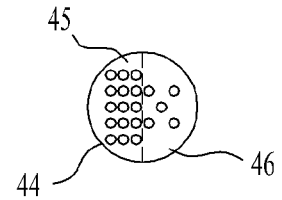
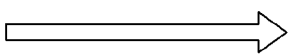
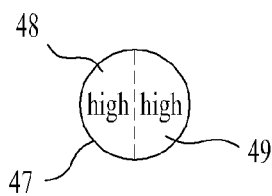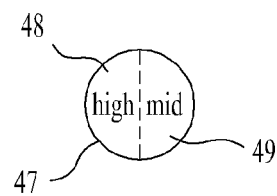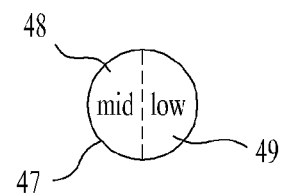

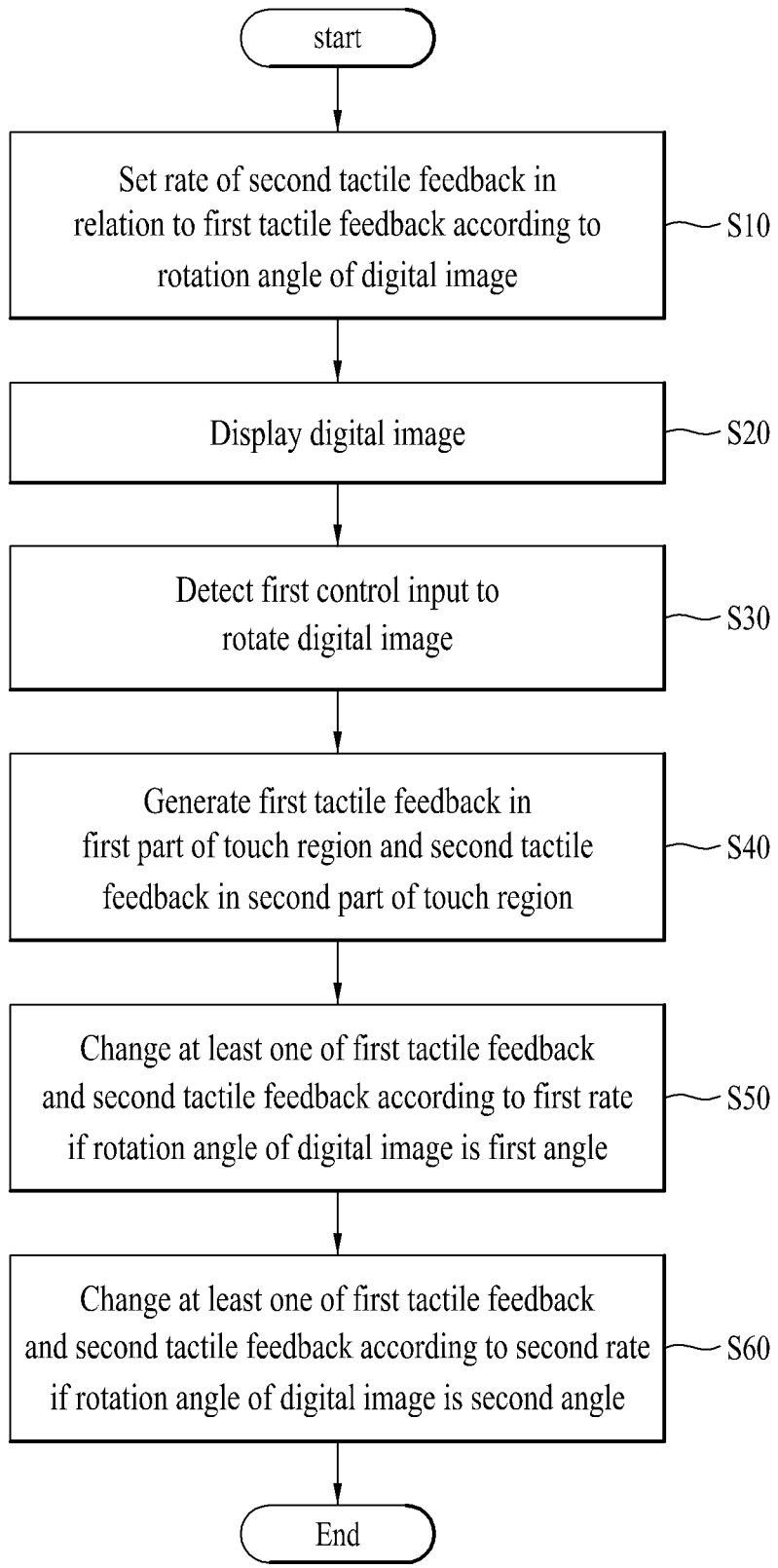

DISPLAY DEVICE GENERATING TACTILE FEEDBACK AND METHOD OF CONTROLLING THE SAME

Pursuant to 35 U.S.C. §119(a), this application claims the benefit of Korean Patent Application No. 10-2013-0114490, filed on Sep. 26, 2013, which is hereby incorporated by reference as if fully set forth herein.

BACKGROUND OF THE INVENTION

1. Field of the Invention

The present disclosure relates to a display device, and more particularly to a display device, which controls a digital image including a tactile feedback.

2. Discussion of the Related Art

As touch sensitive display devices have propagated, users may control touch sensitive display devices by touching a surface of a display device. Hereinafter, a touch sensitive display device may be referred to simply as a display device. The display device may control a displayed digital image in response to a user touch input, and generate a tactile feedback in a region where the touch input is detected. In this way, a user may confirm, via tactile perception, what texture a touched digital image region has.

If the user controls a digital image while receiving a tactile feedback with respect to the texture of the digital image, a display device has difficulty in informing the user of a control state of the digital image via a tactile feedback. Accordingly, the display device needs a method of transmitting the control state of the digital image to the user using a tactile feedback.

SUMMARY OF THE INVENTION

Accordingly, the present disclosure is directed to a display device generating a tactile feedback and a method of controlling the same that substantially obviate one or more problems due to limitations and disadvantages of the related art.

An object of the present disclosure is to provide a display device which may transmit a tactile feedback and a method of controlling the same. More particularly, an object of the present disclosure is to provide a display device, which may generate a tactile feedback with respect to a control state of a digital image, and provide a user with the tactile feedback.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, a display device includes a display unit configured to display a digital image, a sensor unit configured to sense a control input, a tactile feedback unit configured to generate a tactile feedback, and a controller configured to control the display unit, the sensor unit, and the tactile feedback unit, wherein the controller is configured to detect a first control input to rotate the digital image, wherein the controller is configured to generate a first tactile feedback in a first part of a touch region of the first control input and a second tactile feedback in a second part of the touch region when rotation of the digital image begins, wherein the controller is configured to change at least one of the first tactile feedback and the second tactile feedback according to a first rate if a rotation angle of the digital image is a first angle, wherein the controller is configured to change at least one of the first tactile feedback and the second tactile feedback according to a second rate if a rotation angle of the digital image is a second angle, and wherein each of the first rate and the second rate is a rate of the second tactile feedback in relation to the first tactile feedback, and the second rate is greater than the first rate.

In accordance with another embodiment of the disclosure, a method of controlling a display device includes displaying a digital image, detecting a first control input to rotate the digital image, generating a first tactile feedback in a first part of a touch region and a second tactile feedback in a second part of the touch region when rotation of the digital image begins, changing at least one of the first tactile feedback and the second tactile feedback according to a first rate if a rotation angle of the digital image is a first angle, and changing at least one of the first tactile feedback and the second tactile feedback according to a second rate if a rotation angle of the digital image is a second angle, wherein the first rate and the second rate is a rate of the second tactile feedback in relation to the first tactile feedback, and the second rate is greater than the first rate.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings:

FIG. 3 is a view showing a method of providing a tactile feedback corresponding to a 3D digital image of a display device according to another embodiment of the present disclosure;

FIG. 4 is a view showing a method of changing a tactile feedback of a display device according to an embodiment of the present disclosure;

FIG. 8 is a flowchart showing operation of a display device according to an embodiment of the present disclosure.

DETAILED DESCRIPTION OF THE INVENTION

Hereinafter, embodiments will be described in detail with reference to the accompanying drawings and descriptions of the accompanying drawings, but the scope of the disclosure is not limited to or restricted by the embodiments.

Although the terms used in the following description are selected, as much as possible, from general terms that are widely used at present while taking into consideration the functions obtained in accordance with the embodiments, these terms may be replaced by other terms based on intensions of those skilled in the art, customs, emergence of new technologies, or the like. Also, in a particular case, terms that are arbitrarily selected by the applicant may be used. In this case, the meanings of these terms may be described in corresponding description parts of the disclosure. Accordingly, it should be noted that the terms used herein should be construed based on practical meanings thereof and the whole content of this specification, rather than being simply construed based on names of the terms.

In the present disclosure, a display device may be a device including a display unit. For instance, the display device may include a smart-phone, a smart-pad, a laptop computer, a tablet computer, a music player, a smart-table, a monitor, a remote controller, or a television.

Figure 1:
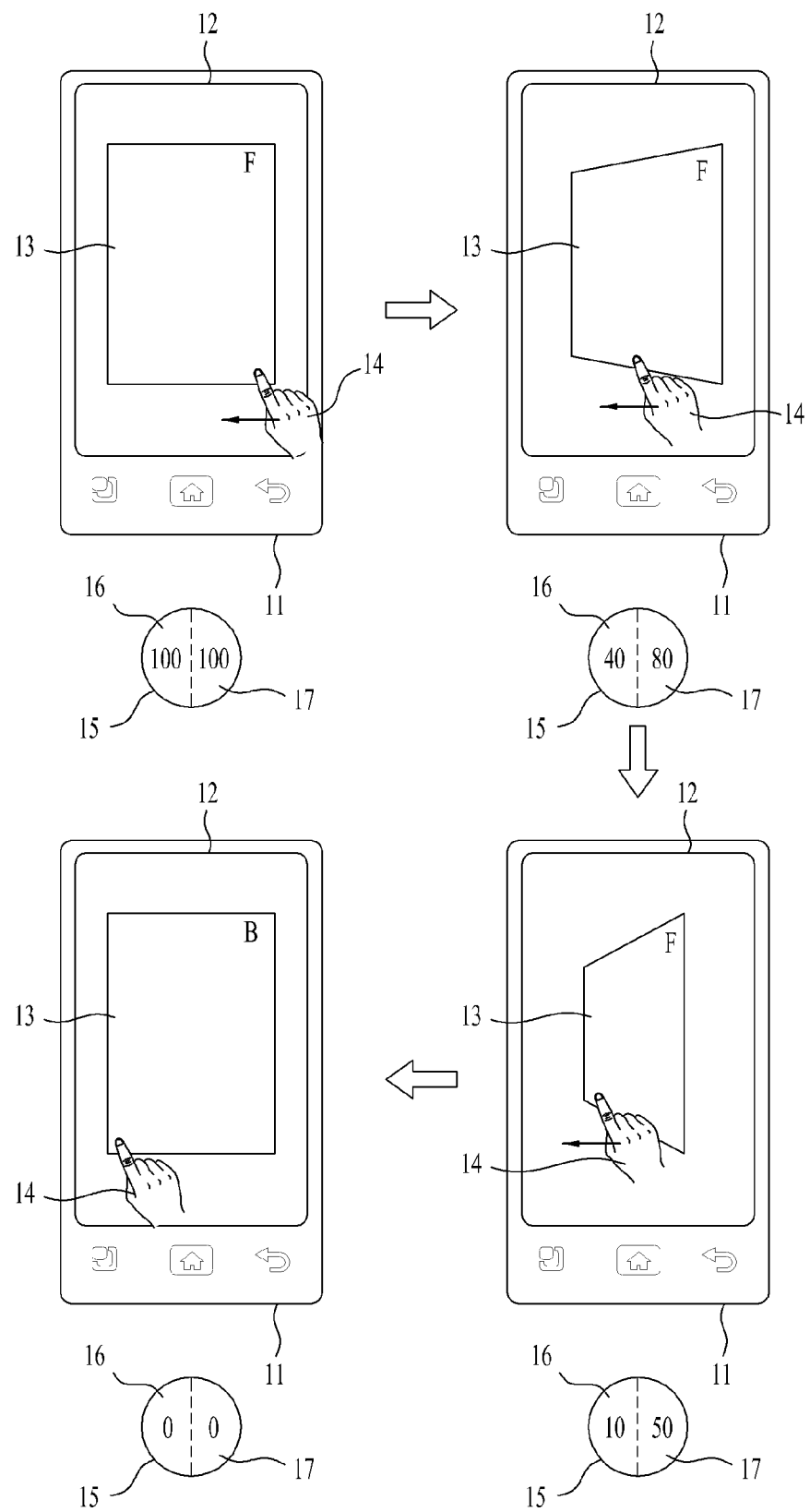
FIG. 1 is a view showing a method of providing a tactile feedback corresponding to a 2D digital image of a display device according to an embodiment of the present disclosure.

FIG. 1 is a view showing a method of providing a tactile feedback corresponding to a 2D digital image of a display device according to an embodiment of the present disclosure. The display device may display a 2-Dimensional (2D) digital image. The 2D digital image may include a front side and a rear side of a digital image. Hereinafter, the 2D digital image may be referred to simply as a digital image. The display device may detect a control input of a user to the digital image, and divide a touch region of the control input into a plurality of regions to generate a tactile feedback on a per region basis. The display device may change the generated tactile feedback according to a control state of the digital image.

The display device, designated by reference numeral 11, may include a display unit 12. The display device 11 may display a digital image 13 using the display unit 12. The display device 11 may display a front side of the digital image 13. The display device 11 may generate a tactile feedback corresponding to the texture of the front side of the digital image 13. The display device 11 may detect a control input 14 to control the digital image 13. The control input 14 may include a touch input. The display device 11 may generate a tactile feedback in a region where the control input 14 is detected. The user may perceive the texture of the digital image 13 via the generated tactile feedback.

The left upper part of FIG. 1 shows a state before the display device 11 detects the control input 14 and controls the digital image 13. In the following description, rotation of the digital image 13 according to an embodiment with regard to control of the digital image 13 will be described. As exemplarily shown in the left upper part of FIG. 1, the display device 11 may generate a tactile feedback in a touch region 15. In FIG. 1, the touch region 15 may refer to a region on the display unit 12 touched by the user's finger. Although the touch region 15 is shown as a circular region in FIG. 1, the touch region 15 may be an oval region according to an embodiment. The display device 11 may divide the touch region 15 into a plurality of regions. For instance, the display device 11 may divide the touch region 15 into a first part 16 and a second part 17. The display device 11 may set one region, located in a movement direction of the control input 14, to the first part 16 and the other region, located in a direction opposite to the movement direction of the control input 14, to the second part 17. Since FIG. 1 shows the control input 14 as moving leftward, the display device 11 may set a left region of the touch region 15 to the first part 16 and a right region of the touch region 15 to the second part 17. Then, the display device 11 may generate a first tactile feedback in the first part 16 and a second tactile feedback in the second part 17.

The display device 11 may generate the first tactile feedback and the second tactile feedback respectively in the first part 16 and the second part 17 of the touch region 15 in response to the control input 14 as a touch input to the digital image 13. The display device 11 may generate the first tactile feedback and the second tactile feedback according to the texture of a region of the digital image 13 corresponding to the touch region 15 of the control input 14. For instance, the display device 11 may generate a first tactile feedback of 100% in the first part 16 and a second tactile feedback of 100% in the second part 17 before the display device 11 detects the control input 14 and rotates the digital image 13. Here, the tactile feedback of 100% may refer to a tactile feedback having the same intensity or density as the intensity or density of an original tactile feedback. Alternatively, the tactile feedback of 100% may refer to generation of a tactile feedback in the entire assigned tactile feedback region. Accordingly, the user may perceive the texture of the front side of the digital image 13 via the control input 14 as a touch input to the digital image 13 displayed on the display unit 12.

In the left upper part of FIG. 1, a rate of the second tactile feedback in relation to the first tactile feedback may be 1. This is because the display device 11 generates the first tactile feedback of 100% and the second tactile feedback of 100%. As will be described hereinafter, the display device 11 may change the rate of the second tactile feedback in relation to the first tactile feedback according to a rotation angle of the digital image 13. The display device 11 may increase the rate of the second tactile feedback in relation to the first tactile feedback in proportion to a rotation angle of the digital image 13. In other words, the display device 11 may increase the rate of the second tactile feedback in relation to the first tactile feedback as a tilt angle of the displayed digital image 13 increases.

The right upper part of FIG. 1 shows a state in which the digital image 13 is rotated leftward by a first angle. The display device 11 may rotate the displayed digital image 13 in response to movement of the control input 14. Here, rotation of the digital image 13 may include 3-Dimensional (3D) rotation. That is, the display device 11 may rotate the digital image 13 in a direction perpendicular to the digital image 13 in response to the control input 14. As such, assuming that the rotation angle of the display device 11 is the first angle, the display device 11 may tilt the displayed digital image 13 by the first angle and display the tilted digital image 13. Here, the first angle may be less than a second angle that will be described hereinafter.

The display device 11 may change the tactile feedback according to the first angle that is the rotation angle of the digital image 13. The display device 11 may change at least one of the first tactile feedback and the second tactile feedback according to a first rate under the assumption that the rotation angle of the digital image 13 is the first angle. Here, the first rate may be defined as a rate of the second tactile feedback in relation to the first tactile feedback under the assumption that the rotation angle of the digital image is the first angle. The display device 11 may further reduce the tactile feedback of one region, among the first part 16 and the second part 17, located in a rotating direction of the digital image 13.

For instance, the display device 11 may generate a first tactile feedback of 40% in the first part 16 included in the touch region 15 and a second tactile feedback of 80% in the second part 17. Here, the tactile feedback of 40% may refer to a tactile feedback having the intensity or density corresponding to 40% of the intensity or density of an original tactile feedback. Alternatively, the tactile feedback of 40% may refer to generation of a tactile feedback only in a partial region corresponding to 40% of an assigned tactile feedback region. In addition, the tactile feedback of 80% may refer to a tactile feedback having the intensity or density corresponding to 80% of the intensity or density of an original tactile feedback. Alternatively, the tactile feedback of 80% may refer to generation of a tactile feedback only in a partial region corresponding to 80% of an assigned tactile feedback region.

In the right upper part of FIG. 1, assuming that the digital image 13 is rotated leftward by the first angle, the first rate of the second tactile feedback in relation to the first tactile feedback may be 2. This is because the display device 11 generates the first tactile feedback of 40% and the second tactile feedback of 80%. The scope of the present disclosure is not limited to the aforementioned numerical values, and detailed numerical values may vary according to embodiments.

The display device 11 may differently change the first tactile feedback and the second tactile feedback generated respectively in the first part 16 and the second part 17 included in the touch region 15 according to a rotation angle as described above, thereby informing the user of a control state of the digital image 13. That is, the display device 11 may change the tactile feedback according to a distance between the touch region 15 and the digital image 13 upon 3D rotation of the digital image 13. As exemplarily shown in the right upper part of FIG. 1, assuming that the digital image 13 is rotated leftward by the first angle, a distance between the first part 16 of the touch region 15 and the digital image 13 may be greater than a distance between the second part 17 and the digital image 13. This is because the display device 11 displays the front side of the digital image 13 as being tilted leftward in a display space. Accordingly, the display device 11 may reduce the first tactile feedback of the first part 16 by a greater rate than a reduction rate of the second tactile feedback of the second part 17.

Accordingly, the user may recognize, based on the changed first tactile feedback and the changed second tactile feedback, that the digital image 13 displayed on the display unit 12 is rotated leftward in response to the control input 14. The user may confirm, via tactile perception, that the digital image 13 is rotated in a direction in which one of the first tactile feedback and the second tactile feedback is further reduced. That is, the display device 11 may change the density or intensity of the tactile feedbacks respectively provided in the first part and the second part while maintaining the texture of the tactile feedbacks corresponding to the digital image 13, thereby informing the user of a control state of the digital image 13.

The right lower part of FIG. 1 shows a state in which the digital image 13 is rotated by a second angle. The display device 11 may rotate the displayed digital image 13 by the second angle in response to movement of the control input 14. Here, rotation of the digital image 13 may include 3D rotation. Accordingly, assuming that the rotation angle of the display device 11 is the second angle, the display device 11 may tilt the displayed digital image 13 by the second angle and display the tilted digital image 13. Here, the second angle may be greater than the first angle as described above.

The display device 11 may change the tactile feedback according to the second angle that is the rotation angle of the digital image 13. The display device 11 may change at least one of the first tactile feedback and the second tactile feedback according to a second rate under the assumption that the rotation angle of the digital image 13 is the second angle. Here, the second rate may be defined as a rate of the second tactile feedback in relation to the first tactile feedback under the assumption that the rotation angle of the digital image 13 is the second angle. The display device 11 may further reduce the tactile feedback of one region, among the first part 16 and the second part 17, located in a rotating direction of the digital image 13.

For instance, the display device 11 may generate a first tactile feedback of 10% in the first part 16 included in the touch region 15 and a second tactile feedback of 50% in the second part 17. Here, the tactile feedback of 10% may refer to a tactile feedback having the intensity or density corresponding to 10% of the intensity or density of an original tactile feedback. Alternatively, the tactile feedback of 10% may refer to generation of a tactile feedback only in a partial region corresponding to 10% of an assigned tactile feedback region. In addition, the tactile feedback of 50% may refer to a tactile feedback having the intensity or density corresponding to 50% of the intensity or density of an original tactile feedback. Alternatively, the tactile feedback of 50% may refer to generation of a tactile feedback only in a partial region corresponding to 50% of an assigned tactile feedback region.

In the right lower part of FIG. 1, assuming that the digital image 13 is rotated by the second angle, the second rate of the second tactile feedback in relation to the first tactile feedback may be 5. This is because the display device 11 generates the first tactile feedback of 10% and the second tactile feedback of 50%. Here, the digital image is rotated by the second angle greater than the first angle, and therefore the second rate may be greater than the first rate. The scope of the present disclosure is not limited to the aforementioned numerical values, and detailed numerical values may vary according to embodiments.

The display device 11 may differently change the first tactile feedback and the second tactile feedback generated respectively in the first part 16 and the second part 17 included in the touch region 15 according to a rotation angle as described above, thereby informing the user of a control state of the digital image 13. That is, the display device 11 may change the tactile feedback according to a distance between the touch region 15 and the digital image 13 upon 3D rotation of the digital image 13. As exemplarily shown in the right lower part of FIG. 1, assuming that the digital image 13 is rotated leftward by the second angle, a distance between the first part 16 of the touch region 15 and the digital image 13 may be greater than a distance between the second part 17 and the digital image 13. Accordingly, the display device 11 may reduce the first tactile feedback of the first part 16 by a greater rate than a reduction rate of the second tactile feedback of the second part 17.

Accordingly, the user may recognize, based on the changed first tactile feedback and the changed second tactile feedback, that the digital image 13 displayed on the display unit 12 is further rotated leftward in response to the control input 14. The user may confirm, via tactile perception, that the digital image 13 is rotated in a direction in which one of the first part and the second part, where the tactile feedback is further reduced, is located. That is, the display device 11 may change the density or intensity of the tactile feedbacks in the first part and the second part while maintaining the texture of the tactile feedbacks corresponding to the digital image 13, thereby informing the user of a control state of the digital image 13.

The left lower part of FIG. 1 shows a state in which rotation of the digital image 13 is completed. The display device 11 may rotate the displayed digital image 13 in response to movement of the control input 14. Here, rotation of the digital image 13 may include 3D rotation. Accordingly, assuming that the rotation angle of the display device 11 is 180 degrees, the display device 11 may rotate the digital image 13 in such a manner that a displayed side of the digital image 13 switches from the front side to the rear side.

The display device 11 may change the tactile feedback as rotation of the digital image 13 is completed. More specifically, as the displayed side of the digital image 13, touched by the control input 14, switches from the front side to the rear side, the display device 11 may change the tactile feedback with respect to the touch region 15.

For instance, the display device 11 may generate a first tactile feedback of 0% in the first part 16 and a second tactile feedback of 0% in the second part 17 if the display device 11 detects the control input 14 and completes rotation of the digital image 13. Here, the tactile feedback of 0% may refer to a tactile feedback having the intensity or density corresponding to 0% of the intensity or density of an original tactile feedback. That is, the display device 11 may remove the tactile feedbacks from the touch region 15.

In another embodiment, the display device 11 may generate tactile feedbacks corresponding to the rear side of the digital image 13 respectively in the first part 16 and the second part 17 of the touch region 15. That is, the display device 11 may generate a third tactile feedback of 100% in the first part 16 and a fourth tactile feedback of 100% in the second part 17. Here, the third tactile feedback and the fourth tactile feedback may be tactile feedbacks corresponding to the texture of the rear side of the digital image 13. In addition, the tactile feedback of 100% may refer to a tactile feedback having the same intensity or density as the intensity or density of an original tactile feedback. Accordingly, the user may perceive the texture of the rear side of the digital image 13 via the control input 14 as a touch input to the digital image 13 displayed on the display unit 12.

The display device 11 may differently change the third tactile feedback and the fourth tactile feedback generated respectively in the first part 16 and the second part 17 included in the touch region 15 according to a rotation angle as described above, thereby informing the user of a control state of the digital image 13.

Accordingly, the user may recognize, based on the changed first tactile feedback and the changed second tactile feedback, that the digital image 13 displayed on the display unit 12 is completely rotated. That is, the display device 11 may inform the user of a control state of the digital image 13 by removing the tactile feedbacks corresponding to the front side of the digital image 13 from the touch region 15, or by generating the tactile feedbacks corresponding to the rear side of the digital image 13.

Figure 2:
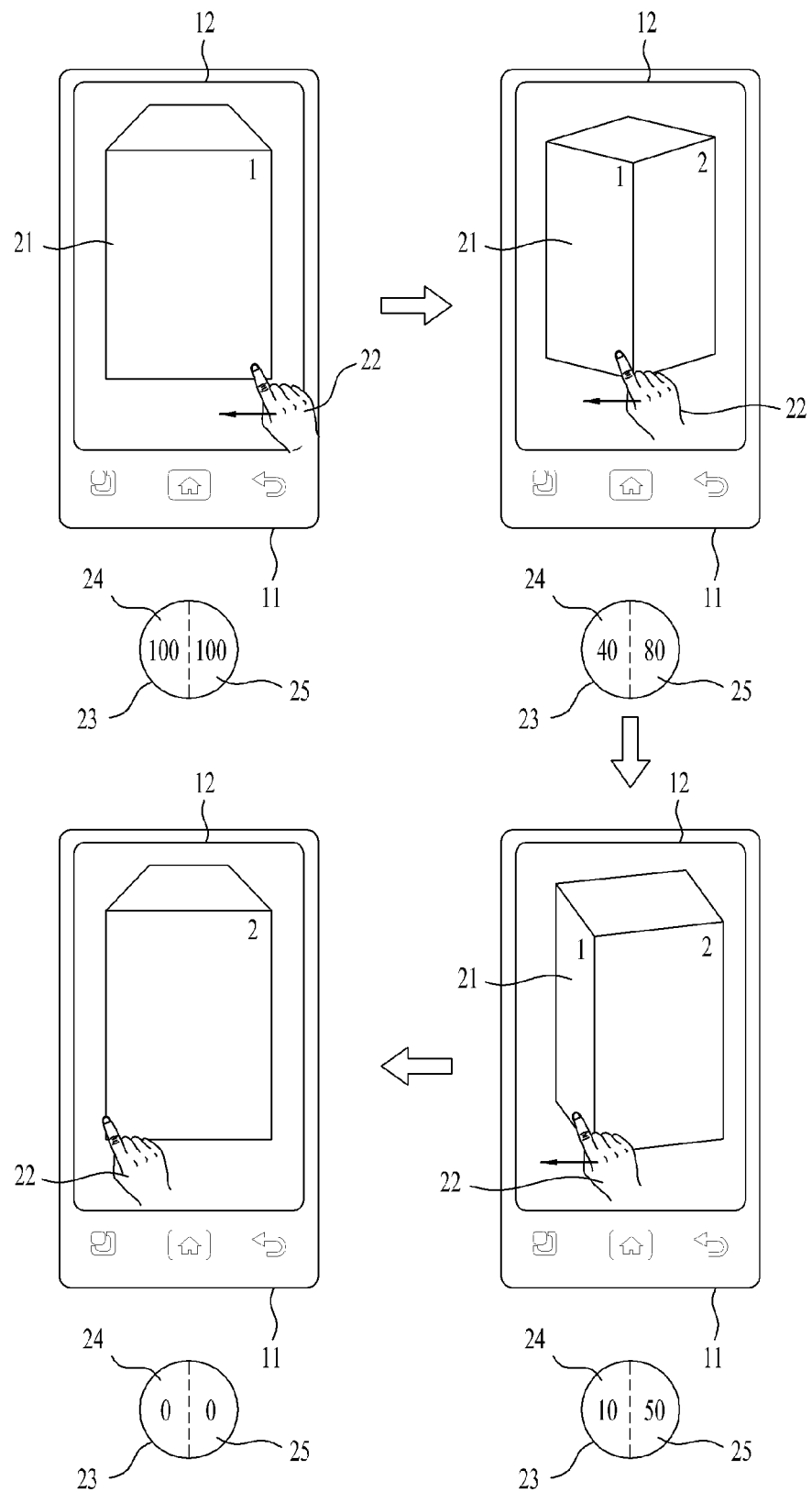
FIG. 2 is a view showing a method of providing a tactile feedback corresponding to a 3D digital image of a display device according to an embodiment of the present disclosure.

FIG. 2 is a view showing a method of providing a tactile feedback corresponding to a 3D digital image of a display device according to an embodiment of the present disclosure. The display device may display a 3D digital image. The 3D digital image may include a plurality of sides. The display device may detect a control input of the user to the 3D digital image, and divide a touch region of the control input into a plurality of regions to generate a tactile feedback on a per region basis. The display device may change the generated tactile feedback according to a control state of the 3D digital image.

The display device 11 may include the display unit 12. The display device 11 may display a 3D digital image 21 using the display unit 12. The display device 11 may display a first side of the 3D digital image 21. The display device 11 may generate a tactile feedback corresponding to the texture of the first side of the 3D digital image 21.

The display device 11 may detect a control input 22 to control the 3D digital image 21. The control input 22 may include a touch input. The display device 11 may generate a tactile feedback in a region where the control input 22 is detected. The user may perceive the texture of the 3D digital image 21 via the generated tactile feedback.

The left upper part of FIG. 2 shows a state before the display device 11 detects the control input 22 and controls the 3D digital image 21. In the following description, rotation of the 3D digital image 21 according to an embodiment with regard to control of the 3D digital image 21 will be described. As exemplarily shown in the left upper part of FIG. 2, the display device 11 may generate a tactile feedback in a touch region 23. In FIG. 2, the touch region 23 may refer to a region on the display unit 12 touched by the user's finger. Although the touch region 23 is shown as a circular region in FIG. 2, the touch region 23 may be an oval region according to an embodiment. The display device 11 may divide the touch region 23 into a plurality of regions. For instance, the display device 11 may divide the touch region 23 into a first part 24 and a second part 25.

The display device 11 may set one region located in a movement direction of the control input 22 to the first part 24 and the other region located in a direction opposite to the movement direction of the control input 22 to the second part 25. Since FIG. 2 shows the control input 22 as moving leftward, the display device 11 may set a left region of the touch region 23 to the first part 24 and a right region of the touch region 23 to the second part 25. The display device 11 may generate a first tactile feedback in the first part 24 and a second tactile feedback in the second part 25.

The display device 11 may generate the first tactile feedback and the second tactile feedback respectively in the first part 24 and the second part 25 of the touch region 23 in response to the control input 23 as a touch input to the 3D digital image 21. The display device 11 may generate the first tactile feedback and the second tactile feedback according to the texture of a region of the 3D digital image 21 corresponding to the touch region 23 of the control input 22. For instance, the display device 11 may generate a first tactile feedback of 100% in the first part 24 and a second tactile feedback of 100% in the second part 25 before the display device 11 detects the control input 22 and rotates the 3D digital image 21. Here, the tactile feedback of 100% may refer to a tactile feedback having the same intensity or density as the intensity or density of an original tactile feedback. Alternatively, the tactile feedback of 100% may refer to generation of a tactile feedback in the entire assigned tactile feedback region. Accordingly, the user may perceive the texture of the first side of the 3D digital image 21 via the control input 22 as a touch input to the 3D digital image 21 displayed on the display unit 12.

In the left upper part of FIG. 2, a rate of the second tactile feedback in relation to the first tactile feedback may be 1. This is because the display device 11 generates the first tactile feedback of 100% and the second tactile feedback of 100%. As will be described hereinafter, the display device 11 may change the rate of the second tactile feedback in relation to the first tactile feedback according to a rotation angle of the 3D digital image 21. The display device 11 may increase the rate of the second tactile feedback in relation to the first tactile feedback in proportion to a rotation angle of the 3D digital image 21. In other words, the display device 11 may increase the rate of the second tactile feedback in relation to the first tactile feedback as a tilt angle of the displayed 3D digital image 21 increases.

The right upper part of FIG. 2 shows a state in which the 3D digital image 21 is rotated leftward by a first angle. The display device 11 may rotate the displayed 3D digital image 21 in response to movement of the control input 22. Here, rotation of the 3D digital image 21 may include 3D rotation. As such, assuming that the rotation angle of the display device 11 is the first angle, the display device 11 may tilt the displayed 3D digital image 21 by the first angle and display the tilted 3D digital image 21. In addition, the display device 11 may display a second side of the rotated 3D digital image 21 as well as the first side of the rotated 3D digital image 21.

The display device 11 may change the tactile feedback according to the first angle that is the rotation angle of the 3D digital image 21. The display device 11 may change at least one of the first tactile feedback and the second tactile feedback according to a first rate under the assumption that the rotation angle of the 3D digital image 21 is the first angle. Here, the first rate may be defined as a rate of the second tactile feedback in relation to the first tactile feedback under the assumption that the rotation angle of the 3D digital image 21 is the first angle. The display device 11 may further reduce the tactile feedback of one region, among the first part 24 and the second part 25, located in a rotating direction of the 3D digital image 21.

For instance, the display device 11 may generate a first tactile feedback of 40% in the first part 24 included in the touch region 23 and a second tactile feedback of 80% in the second part 25. Here, the tactile feedback of 40% may refer to a tactile feedback having the intensity or density corresponding to 40% of the intensity or density of an original tactile feedback. Alternatively, the tactile feedback of 40% may refer to generation of a tactile feedback only in a partial region corresponding to 40% of an assigned tactile feedback region.

In addition, the tactile feedback of 80% may refer to a tactile feedback having the intensity or density corresponding to 80% of the intensity or density of an original tactile feedback. Alternatively, the tactile feedback of 80% may refer to generation of a tactile feedback only in a partial region corresponding to 80% of an assigned tactile feedback region.

In the right upper part of FIG. 2, assuming that the 3D digital image 21 is rotated leftward by the first angle, the first rate of the second tactile feedback in relation to the first tactile feedback may be 2. This is because the display device 11 generates the first tactile feedback of 40% and the second tactile feedback of 80%. The scope of the present disclosure is not limited to the aforementioned numerical values, and detailed numerical values may vary according to embodiments.

The display device 11 may differently change the first tactile feedback and the second tactile feedback generated respectively in the first part 24 and the second part 25 included in the touch region 23 according to a rotation angle as described above, thereby informing the user of a control state of the 3D digital image 21. That is, the display device 11 may change the tactile feedback according to a distance between the touch region 23 and the 3D digital image 21 upon 3D rotation of the 3D digital image 21. As exemplarily shown in the right upper part of FIG. 2, assuming that the 3D digital image 21 is rotated leftward by the first angle, a distance between the first part 24 of the touch region 23 and the first side of the 3D digital image 21 may be greater than a distance between the second part 25 and the first side of the 3D digital image 21. This is because the display device 11 displays the first side of the 3D digital image 21 as being tilted leftward in a display space. Accordingly, the display device 11 may reduce the first tactile feedback of the first part 24 by a greater rate than a reduction rate of the intensity or density of the second tactile feedback of the second part 25.

Accordingly, the user may recognize, based on the changed first tactile feedback and the changed second tactile feedback, that the 3D digital image 21 displayed on the display unit 12 is rotated leftward in response to the control input 22. The user may confirm, via tactile perception, that the 3D digital image 21 is rotated in a direction in which one of the first part 24 and the second part 25, where the tactile feedback is further reduced, is located. That is, the display device 11 may change the density or intensity of the tactile feedbacks in the first part and the second part while maintaining the texture of the tactile feedbacks corresponding to the 3D digital image 21, thereby informing the user of a control state of the 3D digital image 21.

The right lower part of FIG. 2 shows a state in which the 3D digital image 21 is rotated by a second angle. The display device 11 may rotate the displayed 3D digital image 21 by the second angle in response to movement of the control input 22. Here, rotation of the 3D digital image 21 may include 3D rotation. Accordingly, assuming that the rotation angle of the display device 11 is the second angle, the display device 11 may rotate the displayed 3D digital image 21 by the second angle and display the rotated 3D digital image 21. The display device 11 may increase a tilt angle of the first side as rotation of the 3D digital image 21 proceeds. In addition, the display device 11 may display the second side as well as the first side of the rotated 3D digital image 21.

The display device 11 may change the tactile feedback according to the second angle that is the rotation angle of the 3D digital image 21. The display device 11 may change at least one of the first tactile feedback and the second tactile feedback according to a second rate under the assumption that the rotation angle of the 3D digital image 21 is the second angle. Here, the second rate may be defined as a rate of the second tactile feedback in relation to the first tactile feedback under the assumption that the rotation angle of the 3D digital image 21 is the second angle. The display device 11 may further reduce the tactile feedback of one region, among the first part 24 and the second part 25, located in a rotating direction of the 3D digital image 21.

For instance, the display device 11 may generate a first tactile feedback of 10% in the first part 24 included in the touch region 23 and a second tactile feedback of 50% in the second part 25. Here, the tactile feedback of 10% may refer to a tactile feedback having the intensity or density corresponding to 10% of the intensity or density of an original tactile feedback. Alternatively, the tactile feedback of 10% may refer to generation of a tactile feedback only in a partial region corresponding to 10% of an assigned tactile feedback region.

In addition, the tactile feedback of 50% may refer to a tactile feedback having the intensity or density corresponding to 50% of the intensity or density of an original tactile feedback. Alternatively, the tactile feedback of 50% may refer to generation of a tactile feedback only in a partial region corresponding to 50% of an assigned tactile feedback region.

In the right lower part of FIG. 2, assuming that the 3D digital image 21 is rotated by the second angle, the second rate of the second tactile feedback in relation to the first tactile feedback may be 5. This is because the display device 11 generates the first tactile feedback of 10% and the second tactile feedback of 50%. Here, the 3D digital image 21 is rotated by the second angle greater than the first angle, and therefore the second rate may be greater than the first rate. The scope of the present disclosure is not limited to the aforementioned numerical values, and detailed numerical values may vary according to embodiments.

The display device 11 may differently change the first tactile feedback and the second tactile feedback generated respectively in the first part 24 and the second part 25 included in the touch region 23 according to a rotation angle as described above, thereby informing the user of a control state of the 3D digital image 21. That is, the display device 11 may change the tactile feedback according to a distance between the touch region 23 and the 3D digital image 21 upon 3D rotation of the 3D digital image 21. As exemplarily shown in the right lower part of FIG. 2, assuming that the 3D digital image 21 is rotated leftward by the second angle, a distance between the first part 24 of the touch region 23 and the first side may be greater than a distance between the second part 25 and the first side. Accordingly, the display device 11 may reduce the first tactile feedback of the first part 23 by a greater rate than a reduction rate of the second tactile feedback of the second part 25.

Accordingly, the user may recognize, based on the changed first tactile feedback and the changed second tactile feedback, that the 3D digital image 21 displayed on the display unit 12 is further rotated leftward in response to the control input 22. The user may confirm, via tactile perception, that the 3D digital image 21 is further rotated in a direction in which one of the first part 24 and the second part 25, where the tactile feedback is further reduced, is located. That is, the display device 11 may change the density or intensity of the tactile feedbacks in the first part and the second part while maintaining the texture of the tactile feedbacks corresponding to the 3D digital image 21, thereby informing the user of a control state of the 3D digital image 21.

The left lower part of FIG. 2 shows a state in which rotation of the 3D digital image 21 is completed. The display device 11 may rotate the displayed 3D digital image 21 in response to movement of the control input 22. Here, rotation of the 3D digital image 21 may include 3D rotation. Accordingly, assuming that the rotation angle of the display device 11 is 180 degrees, the display device 11 may rotate the 3D digital image 21 in such a way that a displayed side of the 3D digital image 21 switches from the first side to the second side.

The display device 11 may change the tactile feedback as rotation of the 3D digital image 21 is completed. As the displayed side of the 3D digital image 21 touched by the control input 22 switches from the first side to the second side, the display device 11 may change the tactile feedback with respect to the touch region 23.

For instance, the display device 11 may generate a first tactile feedback of 0% in the first part 24 and a second tactile feedback of 0% in the second part 25 if the display device 11 detects the control input 22 and completes rotation of the 3D digital image 21. Here, the tactile feedback of 0% may refer to a tactile feedback having the intensity or density corresponding to 0% of the intensity or density of an original tactile feedback. That is, the display device 11 may remove the tactile feedbacks from the touch region 23.

In another embodiment, the display device 11 may generate tactile feedbacks corresponding to the second side of the 3D digital image 21 respectively in the first part 24 and the second part 25 of the touch region 23. That is, the display device 11 may generate a third tactile feedback of 100% in the first part 24 and a fourth tactile feedback of 100% in the second part 25. Here, the third tactile feedback and the fourth tactile feedback may be tactile feedbacks corresponding to the texture of the second side of the 3D digital image 21. In addition, the tactile feedback of 100% may refer to a tactile feedback having the same intensity or density as the intensity or density of an original tactile feedback. Alternatively, the tactile feedback of 100% may refer to generation of a tactile feedback in the entire assigned tactile feedback region. Accordingly, the user may perceive the texture of the second side of the 3D digital image 21 via the control input 22 as a touch input to the 3D digital image 21 displayed on the display unit 12.

The display device 11 may differently change the first tactile feedback and the second tactile feedback generated respectively in the first part 24 and the second part 25 included in the touch region 23 according to a rotation angle as described above, thereby informing the user of a control state of the 3D digital image 21.

Accordingly, the user may recognize, based on the changed first tactile feedback and the changed second tactile feedback, that the 3D digital image 21 displayed on the display unit 12 is completely rotated. That is, the display device 11 may inform the user of a control state of the 3D digital image 21 by removing the tactile feedbacks corresponding to the first side of the 3D digital image 21 from the touch region 23, or by generating the tactile feedbacks corresponding to the second side of the 3D digital image 21.

FIG. 3 is a view showing a method of providing a tactile feedback corresponding to a 3D digital image of a display device according to another embodiment of the present disclosure. The display device may display a 3D digital image. The 3D digital image may include a plurality of sides. The display device may detect a control input of the user to the 3D digital image, and divide one side, at which the control input is detected, into a plurality of regions to generate a tactile feedback on a per region basis. The display device may change the generated tactile feedback according to a control state of the 3D digital image.

The display device 11 may include the display unit 12. The display device 11 may display a 3D digital image 31 using the display unit 12. The display device 11 may display a first side of the 3D digital image 31. The display device 11 may set a tactile feedback region 33 corresponding to a region where the first side of the 3D digital image 31 is displayed. In addition, the display device 11 may generate a tactile feedback 34 in the tactile feedback region 33. The user may perceive the texture of the first side of the 3D digital image 31 via the generated tactile feedback.

The left upper part of FIG. 3 shows a state before the display device 11 detects a control input 32 and controls the 3D digital image 31. In the following description, rotation of the 3D digital image 31 according to an embodiment with regard to control of the 3D digital image 31 will be described. As exemplarily shown in the left upper part of FIG. 3, the display device 11 may set the tactile feedback region 33 corresponding to the region where the first side is displayed. The tactile feedback region 33 may have the same shape as the first side. The display device 11 may generate the tactile feedback 34 in the set tactile feedback region 33.

The display device 11 may divide the tactile feedback region 33 into a plurality of regions. For instance, the display device 11 may divide the tactile feedback region 33 into a first part and a second part. The display device 11 may set one region located in a movement direction of the control input 32 to the first part and the other region located in a direction opposite to the movement direction of the control input 32 to the second part. Since FIG. 3 shows the control input 32 as moving leftward, the display device 11 may set a left region of the tactile feedback region 33 to the first part and a right region of the tactile feedback region 33 to the second part. The display device 11 may generate a first tactile feedback in the first part and a second tactile feedback in the second part. If the texture of the first part is equal to the texture of the second part, the first tactile feedback and the second tactile feedback may be equal to each other.

The display device 11 may generate a first tactile feedback of 100% in the first part and a second tactile feedback of 100% in the second part before the display device 11 detects the control input 32 and rotates the 3D digital image 31. Here, the tactile feedback of 100% may refer to a tactile feedback having the same intensity or density as the intensity or density of an original tactile feedback. Alternatively, the tactile feedback of 100% may refer to generation of a tactile feedback in the entire assigned tactile feedback region. Accordingly, the user may perceive the texture of the first side of the 3D digital image 31 via the control input 32 as a touch input to the 3D digital image 31 displayed on the display unit 12.

In the left upper part of FIG. 3, a rate of the second tactile feedback in relation to the first tactile feedback may be 1. This is because the display device 11 generates the first tactile feedback of 100% and the second tactile feedback of 100%. As will be described hereinafter, the display device 11 may change the rate of the second tactile feedback in relation to the first tactile feedback according to a rotation angle of the 3D digital image 31. The display device 11 may increase the rate of the second tactile feedback in relation to the first tactile feedback in proportion to a rotation angle of the 3D digital image 31. In other words, the display device 11 may increase the rate of the second tactile feedback in relation to the first tactile feedback as a tilt angle of the displayed 3D digital image 31 increases.

The right upper part of FIG. 3 shows a state in which the 3D digital image 31 is rotated leftward by a first angle. The display device 11 may rotate the displayed 3D digital image 31 in response to movement of the control input 32. Here, rotation of the 3D digital image 31 may include 3D rotation. As such, assuming that the rotation angle of the display device 11 is the first angle, the display device 11 may rotate the displayed 3D digital image 31 by the first angle and display the tilted 3D digital image 31. In addition, the display device 11 may display a second side as well as the first side of the rotated 3D digital image 31.

The display device 11 may change the tactile feedback region 33 according to the first angle that is the rotation angle of the 3D digital image 31. The display device 11 may set the tactile feedback region 33 to correspond to a region of the first side of the rotated 3D digital image 31. The display device 11 may change at least one of the first tactile feedback and the second tactile feedback according to a first rate under the assumption that the rotation angle of the 3D digital image 31 is the first angle. Here, the first rate may be defined as a rate of the second tactile feedback in relation to the first tactile feedback under the assumption that the rotation angle of the 3D digital image 31 is the first angle. The display device 11 may further reduce the tactile feedback of one region, among the first part and the second part, located in a rotating direction of the 3D digital image 31.

For instance, the display device 11 may generate a first tactile feedback of 40% in the first part as the left region of the tactile feedback region 33 and a second tactile feedback of 80% in the second part as the right region of the tactile feedback region 33. In addition, the display device 11 may increase the percentage of the tactile feedback from the first part to the second part in stepwise fashion. That is, to gradually vary the percentage of the tactile feedback, the display device 11 may generate a tactile feedback of 50% and a tactile feedback of 60% in a region located between the first part and the second part.

Here, the tactile feedback of 40% may refer to a tactile feedback having the intensity or density corresponding to 40% of the intensity or density of an original tactile feedback. Alternatively, the tactile feedback of 40% may refer to generation of a tactile feedback only in a partial region corresponding to 40% of an assigned tactile feedback region. In addition, the tactile feedback of 80% may refer to a tactile feedback having the intensity or density corresponding to 80% of the intensity or density of an original tactile feedback. Alternatively, the tactile feedback of 80% may refer to generation of a tactile feedback only in a partial region corresponding to 80% of an assigned tactile feedback region.

In the right upper part of FIG. 3, assuming that the 3D digital image 31 is rotated by the first angle, the first rate of the second tactile feedback in relation to the first tactile feedback may be 2. This is because the display device 11 generates the first tactile feedback of 40% and the second tactile feedback of 80%. The scope of the present disclosure is not limited to the aforementioned numerical values, and detailed numerical values may vary according to embodiments.

The display device 11 may differently change the first tactile feedback and the second tactile feedback generated respectively in the first part and the second part included in the tactile feedback region 33 according to a rotation angle as described above, thereby informing the user of a control state of the 3D digital image 31. That is, the display device 11 may change the tactile feedback according to a depth of the 3D digital image 31 upon 3D rotation of the 3D digital image 31. For instance, the display device 11 may reduce the tactile feedback in proportion to a depth of the 3D digital image 31 on a per region basis.

As exemplarily shown in the right upper part of FIG. 3, assuming that the 3D digital image 31 is rotated leftward by the first angle, the depth of a left region of the first side may be greater than the depth of a right region. This is because the display device 11 displays the first side of the 3D digital image 31 as being tilted leftward in a display space. Accordingly, the display device 11 may reduce the first tactile feedback of the first part of the tactile feedback region 33 by a greater rate than a reduction rate of the second tactile feedback of the second part.

Accordingly, the user may recognize, based on the changed first tactile feedback and the changed second tactile feedback, that the 3D digital image 31 displayed on the display unit 12 is rotated leftward in response to the control input 32. The user may confirm, via tactile perception, that the 3D digital image 31 is rotated in a direction in which one of the first part and the second part, where the tactile feedback is further reduced, is located. That is, the display device 11 may change the density or intensity of the tactile feedbacks in the first part and the second part while maintaining the texture of the tactile feedbacks corresponding to the 3D digital image 31, thereby informing the user of a control state of the 3D digital image 31.

The right lower part of FIG. 3 shows a state in which the 3D digital image 31 is rotated leftward by a second angle. The display device 11 may rotate the displayed 3D digital image 31 by the second angle in response to movement of the control input 32. Here, rotation of the 3D digital image 31 may include 3D rotation. Accordingly, assuming that the rotation angle of the display device 11 is the second angle, the display device 11 may rotate the displayed 3D digital image 31 by the second angle and display the rotated 3D digital image 31. In addition, the display device 11 may display the second side as well as the first side of the rotated 3D digital image 31.

The display device 11 may change the tactile feedback region 33 according to the second angle that is the rotation angle of the 3D digital image 31. The display device 11 may set the tactile feedback region 33 to correspond to a region of the first side of the 3D digital image 31 rotated by the second angle. The display device 11 may change at least one of the first tactile feedback and the second tactile feedback according to a second rate under the assumption that the rotation angle of the 3D digital image 31 is the second angle. Here, the second rate may be defined as a rate of the second tactile feedback in relation to the first tactile feedback under the assumption that the rotation angle of the 3D digital image 31 is the second angle. The display device 11 may further reduce the tactile feedback of one region, among the first part and the second part, located in a rotating direction of the 3D digital image 31.

For instance, the display device 11 may generate a first tactile feedback of 10% in the first part as the left region of the tactile feedback region 33 and a second tactile feedback of 50% in the second part as the right region of the tactile feedback region 33. In addition, the display device 11 may increase the percentage of the tactile feedback from the first part to the second part in stepwise fashion. That is, to gradually vary the tactile feedback, the display device 11 may generate a tactile feedback of 20%, a tactile feedback of 30%, and a tactile feedback of 40% in a region located between the first part and the second part.

Here, the tactile feedback of 10% may refer to a tactile feedback having the intensity or density corresponding to 10% of the intensity or density of an original tactile feedback. Alternatively, the tactile feedback of 10% may refer to generation of a tactile feedback only in a partial region corresponding to 10% of an assigned tactile feedback region. In addition, the tactile feedback of 50% may refer to a tactile feedback having the intensity or density corresponding to 50% of the intensity or density of an original tactile feedback. Alternatively, the tactile feedback of 50% may refer to generation of a tactile feedback only in a partial region corresponding to 50% of an assigned tactile feedback region.

In the right lower part of FIG. 3, assuming that the 3D digital image 31 is rotated by the second angle, a second rate of the second tactile feedback in relation to the first tactile feedback may be 5. This is because the display device 11 generates the first tactile feedback of 10% and the second tactile feedback of 50%. The scope of the present disclosure is not limited to the aforementioned numerical values, and detailed numerical values may vary according to embodiments.

The display device 11 may differently change the first tactile feedback and the second tactile feedback generated respectively in the first part and the second part included in the tactile feedback region 33 according to a rotation angle as described above, thereby informing the user of a control state of the 3D digital image 31. That is, the display device 11 may change the tactile feedback according to a depth of the 3D digital image 31 upon 3D rotation of the 3D digital image 31. For instance, the display device 11 may reduce the tactile feedback in proportion to a depth of the 3D digital image 31 on a per region basis.

As exemplarily shown in the right lower part of FIG. 3, assuming that the 3D digital image 31 is rotated leftward by the second angle, the depth of the left region of the first side may be greater than the depth of the right region. In addition, the depth of the left region of the first side rotated by the second angle may be greater than the depth of the left region of the first side rotated by the first angle. This is because the display device 11 displays the first side of the 3D digital image 31 as being tilted leftward in a display space. Accordingly, the display device 11 may further reduce the first tactile feedback of the first part of the tactile feedback region 33 by a greater rate than a reduction rate of the second tactile feedback of the second part.

Accordingly, the user may recognize, based on the changed first tactile feedback and second tactile feedback, that the 3D digital image 31 displayed on the display unit 12 is rotated leftward in response to the control input 32. The user may confirm, via tactile perception, that the 3D digital image 31 is rotated in a direction in which one of the first part and the second part, where the tactile feedback is further reduced, is located. That is, the display device 11 may change the density or intensity of the tactile feedbacks in the first part and the second part while maintaining the texture of the tactile feedbacks corresponding to the 3D digital image 31, thereby informing the user of a control state of the 3D digital image 31.

The left lower part of FIG. 3 shows a state in which rotation of the 3D digital image 31 is completed. Assuming that the rotation angle of the display device 11 is 180 degrees, the display device 11 may rotate the 3D digital image 31 in such a way that a displayed side of the 3D digital image 31 switches from the first side to the second side.

The display device 11 may change the tactile feedback as rotation of the 3D digital image 31 is completed. The display device 11 may change the tactile feedback 34 with respect to the tactile feedback region 33 as the displayed side of the 3D digital image 31 touched by the control input 32 switches from the first side to the second side.

For instance, the display device 11 may generate a first tactile feedback of 0% in the first part of the tactile feedback region 33 and a second tactile feedback of 0% in the second part if the display device 11 detects the control input 32 and completes rotation of the 3D digital image 31. Here, the tactile feedback of 0% may refer to a tactile feedback having the intensity or density corresponding to 0% of the intensity or density of an original tactile feedback. That is, the display device 11 may remove the tactile feedbacks from the tactile feedback region 33.

In another embodiment, the display device 11 may generate tactile feedbacks corresponding to the second side of the 3D digital image 31 respectively in the first part and the second part of the tactile feedback region 33. That is, the display device 11 may generate a third tactile feedback of 100% in the first part and a fourth tactile feedback of 100% in the second part. Here, the third tactile feedback and the fourth tactile feedback may be tactile feedbacks corresponding to the texture of the second side of the 3D digital image 31. In addition, the tactile feedback of 100% may refer to a tactile feedback having the same intensity or density as the intensity or density of an original tactile feedback. Alternatively, the tactile feedback of 100% may refer to generation of a tactile feedback in the entire assigned tactile feedback region. Accordingly, the user may perceive the texture of the second side of the 3D digital image 31 via the control input 32 as a touch input to the 3D digital image 31 displayed on the display unit 12.

The display device 11 may differently change the first tactile feedback and the second tactile feedback generated respectively in the first part and the second part included in the tactile feedback region 33 according to a rotation angle as described above, thereby informing the user of a control state of the 3D digital image 31.

Accordingly, the user may recognize, based on the changed first tactile feedback and the changed second tactile feedback, that the 3D digital image 31 displayed on the display unit 12 is completely rotated. That is, the display device 11 may inform the user of a control state of the 3D digital image 31 by removing the tactile feedbacks corresponding to the first side of the 3D digital image 31 from the tactile feedback region 33, or by generating the tactile feedback corresponding to the second side of the 3D digital image 31.

FIG. 4 is a view showing a method of changing a tactile feedback of a display device according to an embodiment of the present disclosure. The display device may divide a touch region of a control input detected on the display unit into a plurality of regions. The display device may differently change tactile feedbacks generated in the respective regions according to a movement direction of the control input. In the following description, a method of changing the tactile feedbacks on a per region basis under the assumption that the touch region is divided into two regions will be described. The display device may change the tactile feedback of the touch region by changing at least one of a first tactile feedback generated in a first part and a second tactile feedback generated in a second part. The display device may further reduce the tactile feedback of one region, among the first part and the second part, located in a rotating direction of a digital image. Although change of the first tactile feedback in the first part will be described below by way of example, the scope of the present disclosure is not limited thereto.

The upper part of FIG. 4 shows a tactile feedback generated in a touch region 41 of a control input. Three touch regions 41 exemplarily shown in the upper part of FIG. 4 show change of the tactile feedback generated in the touch region 41 under the assumption that the control input moves from the left side to the right side. The display device may change a generation area of the tactile feedback. The display device may divide the touch region 41 into a first part 43 and a second part 42. The display device may set one region located in a movement direction of the control input to the first part 43 and the other region located in a direction opposite to the movement direction of the control input to the second part 42. In the upper part of FIG. 4, as the control input moves rightward, the display device may set a right region of the touch region 41 to the first part 43 and a left region of the touch region 41 to the second part 42. The display device may generate a first tactile feedback in the first part 43 and a second tactile feedback in the second part 42.

In the upper part of FIG. 4, a left tactile feedback is a tactile feedback before the display device detects and moves the control input. The display device may generate a first tactile feedback in the entire first part 43 and a second tactile feedback in the entire second part 42. As described above with reference to FIGS. 1 to 3, the displayed digital image is not rotated before the control input moves. Accordingly, the display device may generate tactile feedbacks throughout the first part 43 and the second part 42 included in the touch region 41.

In the upper part of FIG. 4, a center tactile feedback is a tactile feedback when the display device rotates a digital image by a first angle after the display device detects and moves the control input. The display device may generate a first tactile feedback in a partial region of the first part 43 and a second tactile feedback in the entire second part 42. The display device may exclude a partial region of the first part 43 located in a movement direction of the control input from a generation region of the first tactile feedback. That is, the display device may remove the first tactile feedback from the right region of the first part 43 located in a movement direction of the control input.

In the upper part of FIG. 4, a right tactile feedback is a tactile feedback when a digital image is rotated by a second angle after the display device detects and moves the control input. The display device may generate a second tactile feedback in the entire second part 42 and a first tactile feedback in a partial region of the first part 43. The display device may exclude a partial region of the first part 43 located in a movement direction of the control input from a generation region of the first tactile feedback. That is, the display device may remove the first tactile feedback from the right region of the first part 43 located in a movement direction of the control input. The area of a region of the first part where the first tactile feedback is generated when the digital image is rotated by the second angle may be less than the area of a region of the first part where the first tactile feedback is generated when the digital image is rotated by the first angle.

As described above, the display device may reduce a generation region of the first tactile feedback in the first part 43 as the control input moves or as the rotation angle of the digital image increases. In this way, the user may confirm change of the tactile feedback according to movement of the control input as well as rotation of the digital image via tactile perception. That is, the user may confirm via tactile perception that the digital image is rotated in a direction in which one of the first part 43 and the second part 42, where the tactile feedback is further reduced, is located.

The middle part of FIG. 4 shows a tactile feedback generated in a touch region 44 of a control input. Three touch regions 44 shown in the middle part of FIG. 4 show change of the tactile feedback generated in the touch region 44 under the assumption that the control input moves from the left side to the right side. The display device may change a density of the tactile feedback. The display device may divide the touch region 44 into a first part 46 and a second part 45. The display device may set one region located in a movement direction of the control input to the first part 46 and the other region located in a direction opposite to the movement direction of the control input to the second part 45. In the middle part of FIG. 4, as the control input moves rightward, the display device may set a right region of the touch region 44 to the first part 46 and a left region of the touch region 44 to the second part 45. The display device may generate a first tactile feedback in the first part 46 and a second tactile feedback in the second part 45.

In the middle part of FIG. 4, a left tactile feedback is a tactile feedback before the display device detects and moves the control input. The display device may generate a first tactile feedback in the entire first part 46 and a second tactile feedback in the entire second part 45. As described above with reference to FIGS. 1 to 3, the displayed digital image is not rotated before the control input moves. Accordingly, the display device may generate tactile feedbacks having the same density throughout the first part 46 and the second part 45 included in the touch region 44. For instance, the display device may generate a first tactile feedback and a second tactile feedback, each of which has a density of 10, respectively in the first part 46 and the second part 45.

In the middle part of FIG. 4, a center tactile feedback is a tactile feedback when a digital image is rotated by a first angle after the display device detects and moves the control input. The display device may maintain a density of the second tactile feedback in the second part 45 and reduce a density of the first tactile feedback in the first part 46. For instance, the display device may generate a first tactile feedback having a density of 5 in the first part 46 and a second tactile feedback having a density of 10 in the second part 45.

In the middle part of FIG. 4, a right tactile feedback is a tactile feedback when a digital image is rotated by a second angle after the display device detects and moves the control input. The display device may maintain a density of the second tactile feedback in the second part 45 and reduce a density of the first tactile feedback in the first part 46. For instance, the display device may generate a first tactile feedback having a density of 2 in the first part 46 and a second tactile feedback having a density of 10 in the second part 45.

As described above, the display device may reduce a density of the first tactile feedback in the first part 45 as the control input moves or as the rotation angle of the digital image increases. According to an embodiment, the display device may reduce a density of the second tactile feedback in the second part 46. However, even in this case, the display device may maintain a density of the second tactile feedback greater than a density of the first tactile feedback. That is, the display device may further reduce a density of the tactile feedback in one region, among the first part 46 and the second part 45, located in a rotating direction of the digital image. In this way, the user may confirm change of the tactile feedback according to movement of the control input as well as rotation of the digital image via tactile perception.

The lower part of FIG. 4 shows a tactile feedback generated in a touch region 47 of a control input. Three touch regions 47 shown in the lower part of FIG. 4 show change of the tactile feedback generated in the touch region 47 under the assumption that the control input moves from the left side to the right side. The display device may change an intensity of the tactile feedback. The display device may divide the touch region 47 into a first part 49 and a second part 48. The display device may set one region located in a movement direction of the control input to the first part 49 and the other region located in a direction opposite to the movement direction of the control input to the second part 48. In the lower part of FIG. 4, as the control input moves rightward, the display device may set a right region of the touch region 47 to the first part 49 and a left region of the touch region 47 to the second part 48. The display device may generate a first tactile feedback in the first part 49 and a second tactile feedback in the second part 48.

In the lower part of FIG. 4, a left tactile feedback is a tactile feedback before display device detects and moves the control input. The display device may generate a first tactile feedback having a high-level intensity in the first part 49 and a second tactile feedback having a high-level intensity in the second part 48. As described above with reference to FIGS. 1 to 3, the displayed digital image is not rotated before the control input moves. Accordingly, the display device may generate tactile feedbacks having the same intensity in the first part 49 and the second part 48 included in the touch region 47.

In the lower part of FIG. 4, a center tactile feedback is a tactile feedback when a digital image is rotated by a first angle after display device detects and moves the control input. The display device may maintain an intensity of the second tactile feedback in the second part 48 and reduce an intensity of the first tactile feedback in the first part 49. For instance, the display device may generate a first tactile feedback having a middle-level intensity in the first part 49 and a second tactile feedback having a middle-level intensity in the second part 48.

In the lower part of FIG. 4, a right tactile feedback is a tactile feedback when a digital image is rotated by a second angle after display device detects and moves the control input. The display device may reduce an intensity of the second tactile feedback in the second part 48 and reduce an intensity of the first tactile feedback in the first part 49. For instance, the display device may generate a first tactile feedback having a low-level intensity in the first part 49 and a second tactile feedback having a middle-level intensity in the second part 48.

As described above, the display device may reduce an intensity of at least one of the first tactile feedback in the first part 49 and the second tactile feedback in the second part 48 as the control input moves or as the rotation angle of the digital image increases.

The user may confirm via tactile perception that the displayed digital image is rotated in a movement direction of the control input, based on the tactile feedback that differently varies on a per section basis in the touch region. That is, the user may confirm via tactile perception that the digital image is rotated in a direction in which one of the first part 43 and the second part 42, where the tactile feedback is further reduced, is located.

Figure 5:
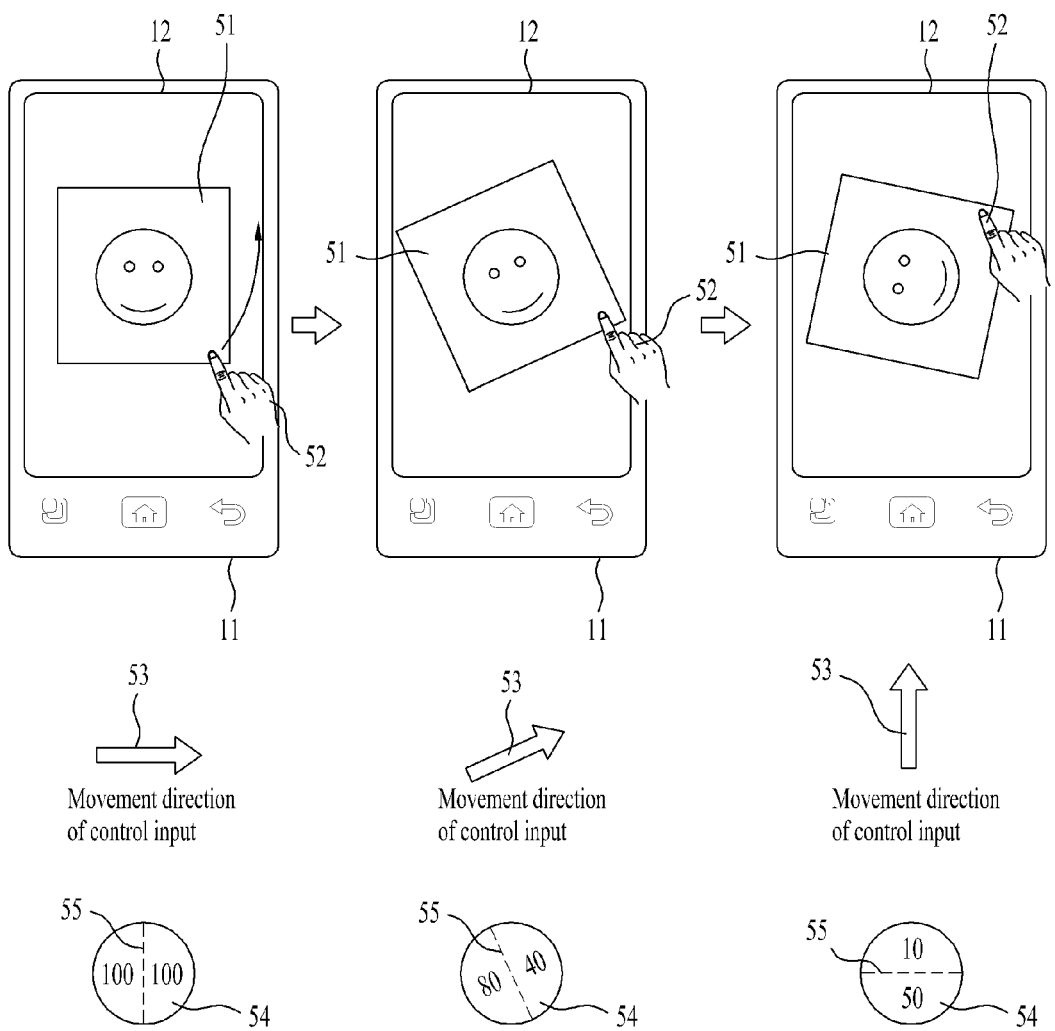
FIG. 5 is a view showing a method of setting the boundary of a tactile feedback of a display device according to an embodiment of the present disclosure.

FIG. 5 is a view showing a method of setting the boundary of a tactile feedback of a display device according to an embodiment of the present disclosure. The display device may divide a touch region of a control input detected on a display unit into a plurality of regions. The display device may change a boundary between a plurality of regions according to a movement direction of the control input. The display device may set the boundary between the plurality of regions to a direction perpendicular to the movement direction of the control input. The display device may rotate a digital image clockwise or counterclockwise in response to the control input. In the following description, with regard to a touch region divided into two regions, a method of changing a boundary that separates the two regions from each other in response to rotation of a digital image will be described.

In the left part of FIG. 5, the display device 11 may display a digital image 51 on the display unit 12. The display device 11 may detect a control input 52 to rotate the digital image 51. The display device 11 may detect the control input 52 to rotate the digital image 51 counterclockwise. In the left part of FIG. 51, the control input 52 may exhibit a rightward movement direction 53 in the initial period of movement. The display device 11 may detect the control input 52 that moves rightward. The display device 11 may divide a touch region 54 in a vertical direction perpendicular to the rightward direction. That is, the display device 11 may set a boundary 55 between a first part and a second part included in the touch region 54 to extend in a vertical direction.

In the center part of FIG. 5, the control input 52 may exhibit an oblique upward and rightward movement direction 53 in the middle period of movement. The display device 11 may detect the control input 52 that moves in an upward and rightward direction. The display device 11 may divide the touch region 54 in an upward and leftward direction or in a downward and rightward direction that is perpendicular to the upward and rightward direction. That is, the display device 11 may set the boundary 55 between the first part and the second part included in the touch region 54 to extend in an upward and leftward direction, or to extend in a downward and rightward direction.

In the right part of FIG. 5, the control input 52 may exhibit an upward movement direction 53 in the last period of movement. The display device 11 may detect the control input 52 that moves upward. The display device 11 may divide the touch region 54 in a horizontal direction perpendicular to the upward movement direction 53. That is, the display device 11 may set the boundary 55 between the first part and the second part included in the touch region 54 to extend horizontally.

As described above, the display device 11 may set the boundary between the first part and the second part of the touch region 54 according to the movement direction 53 of the control input 52. In this way, the user may confirm the movement direction 53 of the control input 52 via tactile perception.

Figure 6:
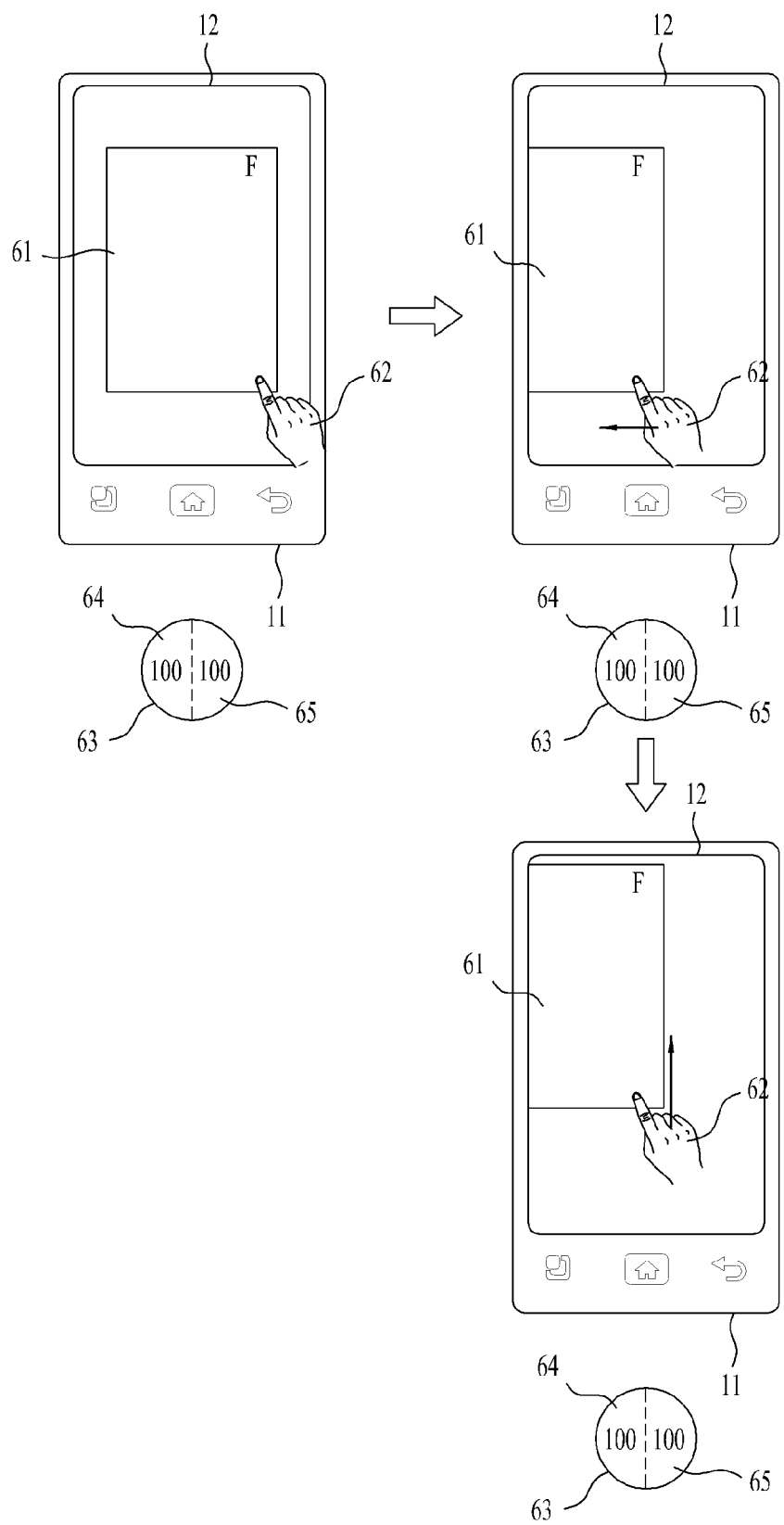
FIG. 6 is a view showing a method of generating a tactile feedback depending on parallel movement of a digital image of a display device according to an embodiment of the present disclosure.

FIG. 6 is a view showing a method of generating a tactile feedback depending on parallel movement of a digital image of a display device according to an embodiment of the present disclosure. The display device may maintain a constant tactile feedback in a touch region if a digital image is subjected to parallel movement rather than rotation. The display device may differently generate a tactile feedback according to whether parallel movement or rotation of the digital image is performed, thereby informing the user of a control state of the digital image and of what control input is input.

The display device 11 may include the display unit 12. The display device 11 may display a digital image 61 using the display unit 12. The display device 11 may display a front side of the digital image 61. The display device 11 may generate a tactile feedback corresponding to the texture of the front side of the digital image 61. The display device 11 may detect a control input 62 to cause parallel movement of the digital image 61. The control input 62 may include a touch input. The display device 11 may generate a tactile feedback in a touch region where the control input 62 is detected. The user may perceive the texture of the digital image 61 via the generated tactile feedback.

The display device 11 may generate a tactile feedback in a touch region 63 if the digital image 61 is subjected to parallel movement. The touch region 63 may include a first part and a second part. The display device 11 may set one region located in a movement direction of the control input 62 to a first part 64 and the other region located in a direction opposite to the movement direction of the control input 62 to a second part 65.

The display device 11 may maintain a constant tactile feedback in the touch region 63 of the control input 62 if the digital image 61 is subjected to parallel movement in response to the control input 62. The display device 11 may maintain the constant tactile feedback in the touch region 63 from the beginning to completion of the parallel movement. For instance, as exemplarily shown in the left upper part of FIG. 6, if the control input 62 is detected, the display device 11 may generate a tactile feedback of 100% in each of the first part 64 and the second part 65 included in the touch region 63. The display device 11 may generate the tactile feedback of 100% in each of the first part 64 and the second part 65 even if the digital image 61 is subjected to leftward parallel movement as exemplarily shown in the right upper part of FIG. 6. In addition, the display device 11 may generate the tactile feedback of 100% in each of the first part 64 and the second part 65 even if the digital image 61 is subjected to upward parallel movement as exemplarily shown in the right lower part of FIG. 6.

As described above, the display device 11 may maintain a constant tactile feedback without change of the tactile feedback generated in the touch region 63 if the digital image 61 is subjected to parallel movement. This may differ from change of the tactile feedback by the display device 11 under the assumption of rotation of the digital image as described above with reference to FIGS. 1 to 5. Accordingly, the user may confirm via tactile perception whether the digital image 61 is subjected to parallel movement or rotation by the control input 62.

Figure 7:
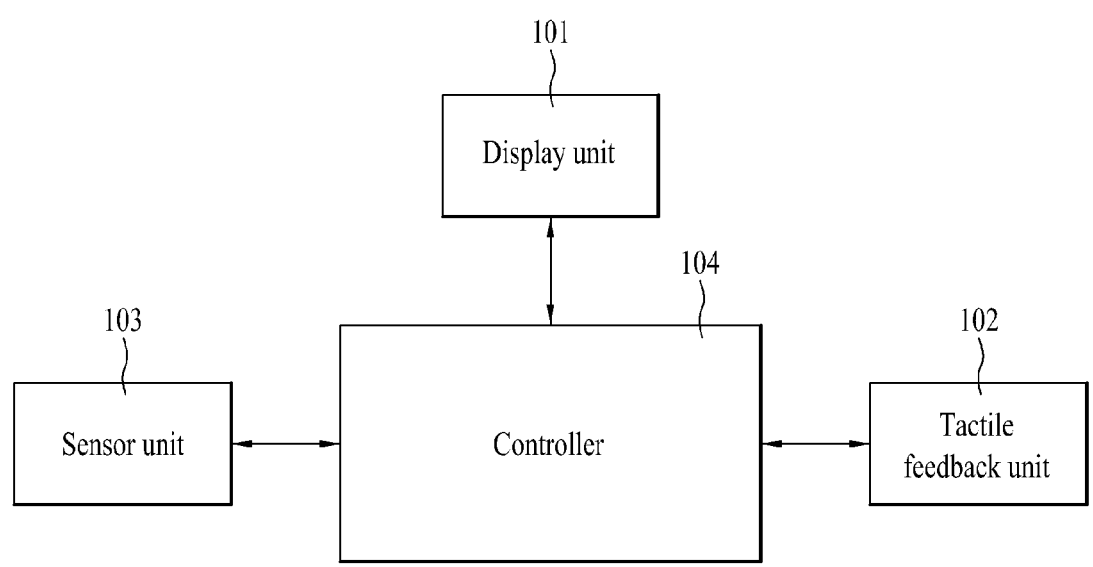
FIG. 7 is a block diagram of a display device according to an embodiment of the present disclosure.

FIG. 7 is a block diagram of a display device according to an embodiment of the present disclosure. The display device may include a display unit 101, a tactile feedback unit 102, a sensor unit 103, and a controller 104.

The display unit 101 may display a digital image. A 2D digital image may include a front side and a rear side, and the display unit 101 may display a front side or rear side of the 2D digital image. In addition, a 3D digital image may include a plurality of sides, and the display unit 101 may display at least one side among the plurality of sides of the 3D digital image.

The display unit 101 may implement 2D rotation or 3D rotation of a displayed digital image. In addition, the display unit 101 may implement parallel movement of a digital image.

The display unit 101 may include at least one of a Light Emitting Diode (LED) device, an Organic Light Emitting Diode (OLED) device, a Liquid Crystal Display (LCD) device, an electronic ink display, and a flexible display according to embodiments. The display unit 101 may include a touch sensitive display unit, and may detect a control input as a touch input to the display unit 101. In addition, the display unit 101 may include a tactile display unit, and may transmit a tactile feedback of the tactile feedback unit 102 that will be described hereinafter to the user.

The tactile feedback unit 102 may generate a tactile feedback in response to a control input. The tactile feedback unit 102 may generate a tactile feedback in a touch region of a control input, the tactile feedback corresponding to the texture of a digital image. In addition, the tactile feedback unit 102 may generate a tactile feedback on a surface of the display unit 101 on which a digital image is displayed.

The tactile feedback unit 102 may change the tactile feedback generated in the touch region based on a rotating direction of a digital image and a movement direction of a control input. The tactile feedback unit 102 may change a generation region, density, or intensity of the tactile feedback, thereby informing the user of control of the digital image or rotation of the digital image.

A method of generating and providing a tactile feedback to the user using the tactile feedback unit 102 will be now described. The tactile feedback unit 102 may transmit a tactile feedback with respect to the user's finger using a micro vibration actuator or an ultrasonic vibration actuator. The tactile feedback unit 102 may control a vibration frequency and a vibration magnitude, and consequently may regulate the intensity of a tactile feedback transmitted to the user's finger.

According to another embodiment, the tactile feedback unit 102 may generate micro-amperage current, and transmit a tactile feedback to the user. The tactile feedback unit 102 may control the intensity and generation period of current, which may allow the user to perceive different tactile sensations.

In addition, the tactile feedback unit 102 may generate a tactile feedback using ultrasonic resonance. The tactile feedback unit 102 may generate ultrasonic waves plural times, and cause resonance of the ultrasonic waves at the user's finger to transmit a tactile feedback to the user. The tactile feedback unit 102 may regulate the magnitude of a resonance frequency and the generation period of resonance to generate different tactile feedbacks. The display unit 101 and the tactile feedback unit 102 as described above may be integrated into a tactile display unit according to an embodiment.

The sensor unit 103 may sense a control input to the display device. The sensor unit 103 may sense a control input as a touch input to the display unit 101. The sensor unit 103 may sense a control input of the user using a pressure sensitive or capacitive touch sensor. In addition, the sensor unit 103 may sense a movement direction of the control input. The sensor unit 103 may transmit information regarding the sensed control input to the controller 104. The display unit 101 and the touch sensor of the sensor unit 103 as described above may be integrated into a touch sensitive display unit according to an embodiment.

The controller 104 may control the display unit 101 and the tactile feedback unit 102 using information transmitted from the sensor unit 103. The controller 104 may detect a control input, and generate a tactile feedback in a touch region of the control input. In addition, the controller 104 may divide the touch region into a plurality of regions. For instance, the controller 104 may divide the touch region into a first part and a second part. The controller 104 may set one region located in a movement direction of the control input to the first part, and the other region located in a direction opposite to the movement direction of the control input to the second part. If the control input moves leftward, the controller 104 may set a left region of the touch region to the first part and a right region of the touch region to the second part. The controller 104 may generate a first tactile feedback in the first part and a second tactile feedback in the second part.

The controller 104 may detect a movement direction of the control input. The controller 104 may change the tactile feedback according to a movement direction of the control input. The controller 104 may change at least one of the first tactile feedback and the second tactile feedback according to a first rate under the assumption that a rotation angle of a digital image is a first angle. Here, the first rate may refer to a rate of the second tactile feedback in relation to the first tactile feedback under the assumption that the rotation angle of the digital image is the first angle. The controller 104 may further reduce the first tactile feedback of the first part located in a movement direction of the control input.

The controller 104 may change at least one of the first tactile feedback and the second tactile feedback according to a second rate under the assumption that a rotation angle of a digital image is a second angle. Here, the second rate may refer to a rate of the second tactile feedback in relation to the first tactile feedback under the assumption that the rotation angle of the digital image is the second angle.

The controller 104 may increase a rate of the second tactile feedback in relation to the first tactile feedback in proportion to the rotation angle of the digital image. In other words, the display device may increase a rate of the second tactile feedback in relation to the first tactile feedback as a tilt angle of the displayed digital image increases. Accordingly, the above-described second rate may be greater than the first rate.

In addition, the controller 104 may divide a touch region of the control input detected on the display unit 101 into a plurality of regions. The controller 104 may change a boundary between the plurality of regions according to a movement direction of the control input. The controller 104 may set the boundary between the plurality of regions to extend in a direction perpendicular to the movement direction of the control input. Accordingly, the controller 104 may change the orientation of a boundary between the above-described first and second parts according to the movement direction of the control input. The controller 104 may reset the first part and the second part according to the changed boundary, and generate a first tactile feedback in the first part and a second tactile feedback in the second part. In this way, the user may confirm the movement direction of the control input via tactile perception.

In FIG. 7 as a block diagram of the display device according to one embodiment, separately shown blocks logically distinguish elements of the display device. Accordingly, the elements of the above-described display device may be mounted as a single chip or a plurality of chips based on device design.

FIG. 8 is a flowchart showing operation of a display device according to an embodiment of the present disclosure. The display device may set a rate of a second tactile feedback in relation to a first tactile feedback according to a rotation angle of a digital image (S10). As described above with reference to FIGS. 1 and 2, the display device may set the rate of the second tactile feedback in relation to the first tactile feedback to the first rate under the assumption that the rotation angle of the digital image is the first angle. In addition, the display device may set the rate of the second tactile feedback in relation to the first tactile feedback to the second rate under the assumption that the rotation angle of the digital image is the second angle.

For instance, the display device may set an intensity of the first tactile feedback to be 40% of an intensity of an original tactile feedback and an intensity of the second tactile feedback to be 80% of the intensity of the original tactile feedback under the assumption that the rotation angle of the digital image is the first angle. Accordingly, the first rate may be 2. In addition, the display device may set an intensity of the first tactile feedback to be 10% of an intensity of an original tactile feedback and an intensity of the second tactile feedback to be 50% of the intensity of the original tactile feedback under the assumption that the rotation angle of the digital image is the second angle. Accordingly, the second rate may be 2.

As such, the display device may set the rate of the second tactile feedback in relation to the first tactile feedback according to the rotation angle.

The display device may display a digital image (S20). The digital image may include a 2D digital image and a 3D digital image. The 2D digital image may include a front side and a rear side, and the display device may display a front side or rear side of the 2D digital image. In addition, the 3D digital image may include a plurality of sides, and the display device may display at least one side of the plurality of sides of the 3D digital image.

The display device may detect a first control input to rotate the digital image (S30). The display device may detect the first control input using a sensor unit. As described above with reference to FIGS. 1 to 3, the first control input may include a touch input to a display unit on which the digital image is displayed, the touch input being implemented to control the displayed digital image. The display device may rotate the digital image according to a movement direction of the first control input. The display device may implement 2D or 3D rotation of the digital image.

The display device may generate a first tactile feedback in a first part of a touch region and a second tactile feedback in a second part of the touch region (S40). As described above with reference to FIGS. 1, 3, and 5, the display device may divide the touch region into the first part and the second part. The display device may set one region located in a movement direction of the control input to the first part and the other region located in a direction opposite to the movement direction of the control input to the second part. If the control input moves leftward, the display device may set a left region of the touch region to the first part and a right region of the touch region to the second part. If the control input moves rightward, the display device may set a right region of the touch region to the first part and a left region of the touch region to the second part.

The display device may generate the first tactile feedback in the first part and the second tactile feedback in the second part. The display device may generate the first tactile feedback and the second tactile feedback based on properties of the digital image and the touch region of the control input. For instance, the display device may generate the first tactile feedback and the second tactile feedback to represent the texture of the digital image corresponding to the touch region of the control input.

The display device may change at least one of the first tactile feedback and the second tactile feedback according to the first rate under the assumption that the rotation angle of the digital image is the first angle (S50). As described above with reference to FIGS. 1, 2, and 4, the display device may detect a movement direction of the control input. The display device may change the tactile feedback according to the movement direction of the control input. The display device may increase a rate of the second tactile feedback in relation to the first tactile feedback in proportion to a rotation angle of the digital image. In other words, the display device may increase the rate of the second tactile feedback in relation to the first tactile feedback as a tilt angle of the digital image increases. The display device may change at least one of the first tactile feedback and the second tactile feedback according to the first rate set as described above under the assumption that the rotation angle of the digital image is the first angle.

The display device may further reduce the first tactile feedback of the first part located in the movement direction of the control input. For instance, if a first tactile feedback of 100% is generated before rotation of a digital image, the display device may generate a first tactile feedback of 40% under the assumption that a rotation angle of the digital image is a first angle. On the other hand, if a second tactile feedback of 100% is generated before rotation of a digital image, the display device may generate a second tactile feedback of 80% under the assumption that a rotation angle of the digital image is a first angle. As such, the display device may differentially change the first tactile feedback and the second tactile feedback according to a movement direction of the control input and a rotating direction of the digital image. Accordingly, the user may confirm the tactile feedback via tactile perception, and recognize a control state of the digital image including a movement direction of the control input and a rotating direction of the digital image. That is, the user may confirm via tactile perception that the digital image is rotated in a direction in which the tactile feedback of one of the first part and the second part is further reduced.

The display device may change at least one of the first tactile feedback and the second tactile feedback according to a second rate under the assumption that the rotation angle of the digital image is the second angle (S60). As described above with reference to FIGS. 1, 2, and 4, the display device may change at least one of the first tactile feedback and the second tactile feedback according to the second rate under the assumption that the rotation angle of the digital image is the second angle. Here, the second rate may refer to a rate of the second tactile feedback in relation to the first tactile feedback under the assumption that the rotation angle of the digital image is the second angle. The second rate may be greater than the first rate. The display device may further reduce the first tactile feedback of the first part located in a movement direction of the control input.

For instance, if a first tactile feedback of 40% is generated under the assumption that the digital image is rotated by the first angle, the display device may generate a first tactile feedback of 10% under the assumption that the rotation angle of the digital image is the second angle. On the other hand, if a second tactile feedback of 80% is generated under the assumption that the rotation angle of the digital image is the first angle, the display device may generate a second tactile feedback of 50% under the assumption that the rotation angle of the digital image is the first angle. As such, the display device may differentially change the first tactile feedback and the second tactile feedback according to a rotating direction of the digital image and a movement direction of the control input. Accordingly, the user may confirm the tactile feedback via tactile perception, and the display device may inform the user of a control state of the digital image including a movement direction of the control input and a rotating direction of the digital image. That is, the user may confirm via tactile perception that the digital image is rotated in a direction in which the tactile feedback of one of the first part and the second part is further reduced.

As described above, the display device of the present disclosure may differentially change a tactile feedback generated in each of a plurality of regions included in a touch region according to a rotation angle of a digital image. Accordingly, the user may confirm differentially changed tactile feedbacks via tactile perception, and recognize a control state of the digital image including a rotating direction of the digital image.

As is apparent from the above description, according to the present disclosure, a display device may inform a user of a control state of a digital image.

According to the present disclosure, a display device may represent a control state of a digital image using a tactile feedback.

According to the present disclosure, a display device may change a tactile feedback according to rotation of a digital image.

According to the present disclosure, a display device may divide a touch region into a plurality of regions to generate different tactile feedbacks in the respective regions.

According to the present disclosure, a display device may control a rate of a tactile feedback in a second part in relation to a tactile feedback in a first part according to a control state of a digital image, the first part and the second part being included in a touch region.

According to the present disclosure, a display device may change a tactile feedback in stepwise fashion according to a rotation angle of a digital image.

According to the present disclosure, a display device may control a tactile feedback by changing the intensity, density, or generation region of the tactile feedback.

According to the present disclosure, a display device may move a boundary between a first part and a second part included in a touch region according to a movement direction of a control input.

It will be apparent that, although the preferred embodiments have been shown and described above, the disclosure is not limited to the above-described specific embodiments, and various modifications and variations can be made by those skilled in the art without departing from the gist of the appended claims. Thus, it is intended that the modifications and variations should not be understood independently of the technical sprit or prospect of the disclosure.

What is claimed is:

1. A display device comprising:
a display unit configured to display a digital image;
a sensor unit configured to sense a control input;
a tactile feedback unit configured to generate a tactile feedback; and
a controller configured to control the display unit, the sensor unit, and the tactile feedback unit,
wherein the controller is further configured to:
detect a first control input to rotate the digital image,
generate a first tactile feedback in a first part of a touch region of the first control input and a second tactile feedback in a second part of the touch region when rotation of the digital image begins,
change at least one of the first tactile feedback and the second tactile feedback according to a first rate if a rotation angle of the digital image is a first angle, and
change at least one of the first tactile feedback and the second tactile feedback according to a second rate if the rotation angle of the digital image is a second angle, wherein each of the first rate and the second rate is a rate of the second tactile feedback in relation to the first tactile feedback, and the second rate is greater than the first rate.

2. The display device according to claim 1, wherein the controller is configured to remove the first tactile feedback and the second tactile feedback from the touch region of the first control input when the rotation of the digital image is completed.

3. The display device according to claim 1, wherein the first part of the touch region is located in a movement direction of the first control input, and
wherein the second part of the touch region is located in a direction opposite to the movement direction of the first control input.

4. The display device according to claim 1, wherein the controller is configured to change at least one of an intensity of the first tactile feedback and an intensity of the second tactile feedback according to the first rate or the second rate.

5. The display device according to claim 1, wherein the controller is configured to change at least one of a density of a portion of the first part where the first tactile feedback is generated and a density of a portion of the second part where the second tactile feedback is generated according to the first rate or the second rate.

6. The display device according to claim 1, wherein the controller is configured to change a size of at least one of the first part and the second part according to the first rate or the second rate.

7. The display device according to claim 1, wherein the controller is configured to change at least one of the first tactile feedback and the second tactile feedback in stepwise fashion according to the first rate or the second rate during the rotation of the digital image.

8. The display device according to claim 1, wherein the digital image is a 3-Dimensional (3D) image including a first side and a second side, and
wherein the controller is configured to display the first side of the 3D image, and to switch from the displayed first side to the second side and display the second side in response to the first control input.

9. The display device according to claim 1, wherein the digital image is a 2-Dimensional (2D) image, and
wherein the controller is configured to rotate the 2D image in a direction perpendicular to the 2D image in response to the first control input.

10. The display device according to claim 9, wherein the 2D image includes a front side and a rear side, and
wherein the controller is configured to display the front side of the 2D image, and to switch from the displayed front side to the rear side and display the rear side in response to the first control input.

11. The display device according to claim 1, wherein the digital image is a 2D image, and
wherein the controller is configured to rotate the 2D image clockwise or counterclockwise in response to the first control input.

12. The display device according to claim 1, wherein the controller is configured to sense a second control input for parallel movement of the digital image, and
wherein the controller is configured to maintain a constant third tactile feedback in a touch region of the second control input from the beginning to completion of parallel movement of the digital image.

13. The display device according to claim 1, wherein the first tactile feedback and the second tactile feedback are generated according to the texture of the displayed digital image.

14. The display device according to claim 1, wherein the touch region of the first control input is divided into the first part and the second part.

15. The display device according to claim 1, wherein a boundary between the first part and the second part is determined by a movement direction of the first control input.

16. The display device according to claim 15, wherein the boundary between the first part and the second part is set to a direction perpendicular to a movement direction of the first control input.

17. The display device according to claim 1, wherein the first angle is less than the second angle.

18. The display device according to claim 17, wherein an intensity or density of the first tactile feedback is reduced if the rotation angle of the digital image is changed from the first angle to the second angle.

19. The display device according to claim 1, wherein the display device includes a smart-phone, a smart-pad, a music player, a smart-table, a monitor, a television, or a tablet computer.

20. A method of controlling a display device, the method comprising:
displaying a digital image;
detecting a first control input to rotate the digital image;
generating a first tactile feedback in a first part of a touch region and a second tactile feedback in a second part of the touch region of the first control input when rotation of the digital image begins;
changing at least one of the first tactile feedback and the second tactile feedback according to a first rate if a rotation angle of the digital image is a first angle; and
changing at least one of the first tactile feedback and the second tactile feedback according to a second rate if the rotation angle of the digital image is a second angle,
wherein the first rate and the second rate is a rate of the second tactile feedback in relation to the first tactile feedback, and the second rate is greater than the first rate.

* * * * *